(12) United States Patent
Eriksson et al.

(10) Patent No.: US 9,197,379 B2
(45) Date of Patent: Nov. 24, 2015

(54) METHODS AND APPARATUS FOR MODIFIED PHICH

(75) Inventors: Erik Eriksson, Linköping (SE); Cheng Jung-Fu, Fremont, CA (US); Daniel Larsson, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 555 days.

(21) Appl. No.: 13/499,720

(22) PCT Filed: Feb. 9, 2012

(86) PCT No.: PCT/SE2012/050123
§ 371 (c)(1),
(2), (4) Date: Sep. 27, 2012

(87) PCT Pub. No.: WO2013/051980
PCT Pub. Date: Apr. 11, 2013

(65) Prior Publication Data
US 2013/0083740 A1    Apr. 4, 2013

Related U.S. Application Data

(60) Provisional application No. 61/542,500, filed on Oct. 3, 2011.

(51) Int. Cl.
*H04W 72/04* (2009.01)
*H04L 1/18* (2006.01)

(52) U.S. Cl.
CPC ................... *H04L 1/1861* (2013.01)

(58) Field of Classification Search
CPC ........................................ H04L 1/1861
USPC ............................................ 370/329
See application file for complete search history.

(56) References Cited

U.S. PATENT DOCUMENTS

2010/0054188 A1    3/2010  Matsumoto et al.
2010/0195583 A1*   8/2010  Nory et al. ............. 370/329

* cited by examiner

*Primary Examiner* — Jung Park
*Assistant Examiner* — Albert Shih
(74) *Attorney, Agent, or Firm* — Murphy, Bilak & Homiller, PLLC

(57) ABSTRACT

Techniques provide additional Hybrid-ARQ indication resources for LTE TDD subframes that are normally without conventional LTE PHICH resources or that have too few LTE PHICH resources. In some embodiments, a modified PHICH is created using unused REGs in the control region of the downlink subframe. In others, a modified PHICH resides within the resources of an AL=1 PDCCH, and is formed using encoding and modulation processes that differ from normal PDCCH processing. In other embodiments, the PUSCH HARQ feedback bits are carried by a conventional LTE PDCCH, which is distinguished from other PDCCHs by scrambling it with a new type of RNTI: HARQ indicator Radio-network temporary identifier (HI-RNTI). In still other embodiments, the modulation symbols of PHICH are then placed on top of those normally reserved for PDCCHs. For such overlapped radio resources, the modulation symbols from the modified PHICH will replace those from normal PDCCHs for transmission.

27 Claims, 19 Drawing Sheets

METHODS AND APPARATUS FOR MODIFIED PHICH

RELATED APPLICATION

This application claims priority to U.S. Provisional Patent Application Ser. No. 61/542,500, filed 3 Oct. 2011.

TECHNICAL FIELD

The present invention relates general to carrier aggregation in a mobile communication system and, more particularly, to an efficient resource allocation for Hybrid-ARQ indicators in a downlink carrier.

BACKGROUND

Carrier aggregation is one of the new features recently developed by the members of the 3rd-Generation Partnership Project (3GPP) for so-called Long Term Evolution (LTE) systems, and is standardized as part of LTE Release 10, which is also known as LTE-Advanced. An earlier version of the LTE standards, LTE Release 8, supports bandwidths up to 20 MHz. In LTE-Advanced, bandwidths up to 100 MHz are supported. The very high data rates contemplated for LTE-Advanced will require an expansion of the transmission bandwidth. In order to maintain backward compatibility with LTE Release 8 user terminals, the available spectrum is divided into Release 8-compatible chunks called component carriers. Carrier aggregation enables bandwidth expansion beyond the limits of LTE Release 8 systems by allowing user terminals to transmit data over multiple component carriers, which together can cover up to 100 MHz of spectrum. Importantly, the carrier aggregation approach ensures compatibility with earlier Release 8 terminals, while also ensuring efficient use of a wide carrier by making it possible for legacy terminals to be scheduled in all parts of the wideband LTE-Advanced carrier.

The number of aggregated component carriers, as well as the bandwidth of the individual component carrier, may be different for uplink (UL) and downlink (DL) transmissions. A symmetric configuration refers to the case where the number of component carriers in downlink and uplink is the same. An asymmetric configuration refers to the case where the number of component carriers is different. The number of component carriers configured for a geographic cell area may be different from the number of component carriers seen by a given terminal. A user terminal, for example, may support more downlink component carriers than uplink component carriers, even though the same number of uplink and downlink component carriers may be offered by the network in a particular area.

LTE systems can operate in either Frequency Division Duplex (FDD) mode or Time Division Duplex (TDD) mode. In FDD mode, downlink and uplink transmissions take place in different, sufficiently separated, frequency bands. In TDD mode, on the other hand, downlink and uplink transmission take place in different, non-overlapping time slots. Thus, TDD can operate in unpaired spectrum, whereas FDD requires paired spectrum.

TDD mode allows for different asymmetries in terms of the amount of resources allocated for uplink and downlink transmission, respectively, by means of different downlink/uplink configurations. These differing configurations allow the shared frequency resources to be allocated to downlink and uplink use in differing proportions. Accordingly, uplink and downlink resources can be allocated asymmetrically for a given TDD carrier.

To avoid severe interference between downlink and uplink transmissions among different cells, neighbor cells should generally have the same downlink/uplink configuration. If this is not done, uplink transmission in one cell may interfere with downlink transmission in the neighboring cell (and vice-versa). Hence, downlink/uplink asymmetry can typically not vary between carriers/cells, but is signaled as part of the system information and remains fixed for a long period of time.

One consideration for carrier aggregation is how to transmit control signaling on the downlink from the wireless base station (an "eNodeB" or "eNB" in 3GPP terminology) to a mobile terminal (a "user equipment" or "UE" in 3GPP terminology). Downlink control signaling may include downlink assignment and uplink grant information (collectively referred to as "resource grant information" herein) as well as acknowledgement (ACK) signaling for hybrid automatic repeat request (Hybrid-ARQ, or HARQ) protocols. One solution is to transmit all types of downlink control information on multiple downlink component carriers associated with different uplink component carriers. However, additional control signaling issues arise when uplink and downlink resources are asymmetrical, whether in terms of uplink/downlink carriers or uplink/downlink subframes, or both.

SUMMARY

In several carrier aggregation scenarios, certain downlink subframes are without sufficient conventional PHICH resources for providing PUSCH HARQ feedback. Accordingly, techniques are needed to provide additional Hybrid-ARQ indication resources for LTE TDD subframes that are normally without conventional LTE PHICH resources or that have too few LTE PHICH resources. Several such techniques are described herein, many of which are also applicable to FDD subframes with too few conventional LTE PHICH resources. These methods may be implemented in an LTE eNB supporting carrier aggregation or in a similar node in other wireless systems having Hybrid-ARQ resource indicator resource needs similar to those discussed above.

In some embodiments of the techniques disclosed herein, a modified PHICH is created using unused REGs in the control region of the downlink subframe. In others, a modified PHICH resides within the resources of an AL=1 PDCCH, and is formed using encoding and modulation processes that differ from normal PDCCH processing. In other embodiments, the PUSCH HARQ feedback bits are carried by a conventional LTE PDCCH, which is distinguished from other PDCCHs by scrambling it with a new type of RNTI: HARQ indicator Radio-network temporary identifier (HI-RNTI). In still other embodiments, the modulation symbols of PHICH are then placed on top of those normally reserved for PDCCHs. For such overlapped radio resources, the modulation symbols from the modified PHICH will replace those from normal PDCCHs for transmission. Alternatively, the modulation symbols for the modified PHICH and normal PDCCHs are both transmitted. As discussed below, two or more of these techniques may be combined, in some embodiments, to provide additional or more flexible capacity for transmitting PHICH.

An example method, suitable for implementation by a wireless base station configured for operation in a Long-Term Evolution, LTE, wireless network, provides Hybrid-ARQ signaling in a downlink carrier signal by mapping a Physical Control Format Indicator Format Channel (PCFICH) to first resource elements in a control region of a downlink subframe, and optionally mapping one or more Physical Hybrid-ARQ Indicator Channels (PHICHs) to second resource elements of the control region of the downlink subframe, then assembling a plurality of Physical Downlink Control Channels (PDCCHs) for carrying resource grant information, by aggregating control channel elements (CCEs) and allocating the aggregated CCEs to first resource element groups (REGs), each REG representing four available resource elements of the control region of the downlink subframe. An encoded group of Hybrid-ARQ indicators is then allocated to a plurality of second REGs, in many cases after said assembling of the PDCCHs. The first REGs and the second REGS are mapped onto the control region of the first subframe, around the resource elements used by the PHICHs, if present, and the PCFICH. The resulting downlink subframe is then transmitted to one or more mobile terminals.

In some embodiments of the preceding method, the second REGs are REGs that are not used by any of the PDCCHs. In some of these embodiments, the encoded group of Hybrid-ARQ indicators is allocated to REGs that are inaccessible to any PDCCH. The second REGs may be non-consecutive REGs in a high REG-index region of the control region, or consecutive REGs placed at an end of the available REG region, or consecutive REGs immediately adjacent to a last usable position for PDCCHs, in various embodiments. In any of these embodiments, the encoded group of Hybrid-ARQ indicators may comprise eight Hybrid-ARQ indicator bits that are encoded, modulated, and scrambled to form twelve symbols, where the twelve symbols are allocated to three REGs. Likewise, in any of these embodiments, the entire collection of first REGs and second REGs are interleaved, the interleaved REGs are cyclically shifted, and the shifted, interleaved REGs are assigned to resource elements of the control region that are unused by PHICHs, if present, and PCFICHs.

In a variant of the preceding technique, the encoded group of Hybrid-ARQ indicators are allocated to the second REGs by placing the encoded group of Hybrid-ARQ indicators in a CCE that is unused by a PDCCH carrying resource grant information. In some cases, the encoded group of Hybrid-ARQ indicators comprises eight Hybrid-ARQ indicator bits that are encoded, modulated, and scrambled to form twelve symbols, corresponding to three REGs, and the encoded group of Hybrid-ARQ indicators is placed in the CCE along with one or two additional encoded groups of Hybrid-ARQ indicators. The three REGs for the encoded group of Hybrid-ARQ indicators may be interlaced within the CCE with REGs for the additional encoded groups of Hybrid-ARQ indicators. Alternatively, the encoded group of Hybrid-ARQ indicators may comprise eight Hybrid-ARQ indicator bits that are encoded, modulated, and scrambled to form thirty-six symbols, corresponding to nine REGs.

In another variant of the preceding techniques, the encoded group of Hybrid-ARQ indicators comprises a plurality of Hybrid-ARQ indicators that are encoded with a cyclic redundancy check, CRC, code that depends on a temporary identifier that distinguishes the encoded group of Hybrid-ARQ indicators from encoded resource grant information.

In still another variant, the encoded group of Hybrid-ARQ indicators comprises eight Hybrid-ARQ indicator bits that are encoded, modulated, and scrambled to form twelve symbols, and the twelve symbols are placed in one or more CCEs of a PDCCH carrying resource grant information. In some of these embodiments, the twelve symbols replace symbols carrying encoded resource grant information, while in others the twelve symbols are combined with symbols carrying encoded resource grant information.

Corresponding methods for implementation in a UE or other radio access terminal follow directly from the above-summarized techniques. More particularly, these methods comprise receiving a signal that includes subframes modified according to one or more of the above techniques, and retrieving PHICH signals from the received subframes by reversing the techniques used to encode them. Also following directly from the above-summarized techniques are apparatus configured to carry them out, including base station apparatus comprising processing circuits arranged to implement the techniques described in detail below, as well as mobile terminal apparatus, also comprising processing circuits and arranged to carry out the complementary methods for receiving PHICH signals.

DETAILED DESCRIPTION

Figure 1:
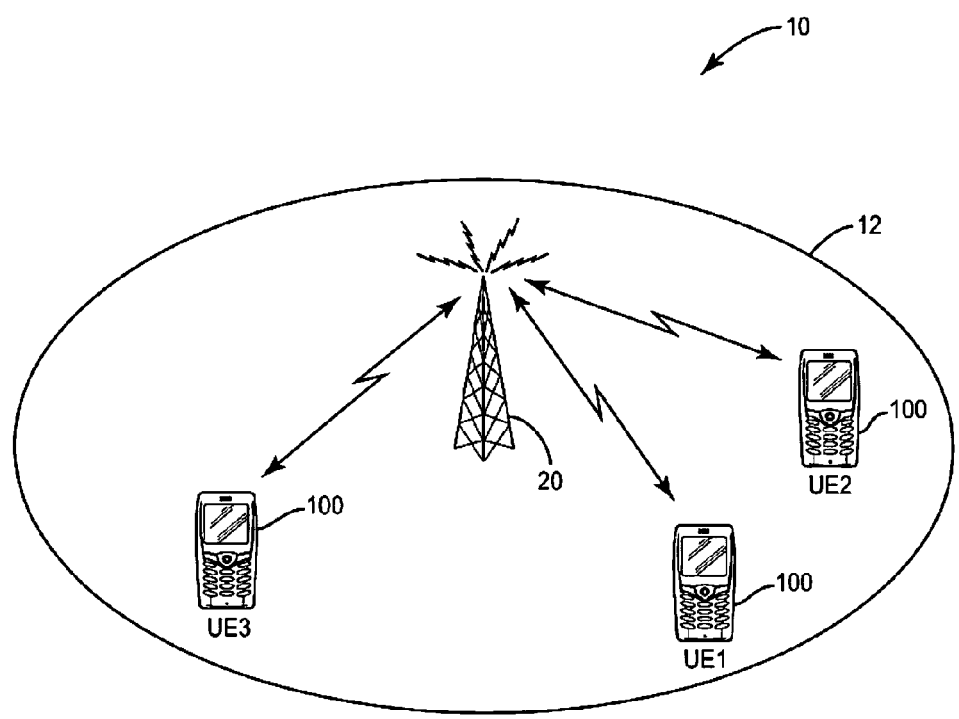
FIG. 1 illustrates an example of an OFDM communication system.

Referring now to the drawings, FIG. 1 illustrates an exemplary mobile communication network 10 for providing wireless communication services to user terminals 100. Three user terminals 100 are shown in FIG. 1. The user terminals 100 may comprise, for example, cellular telephones, personal digital assistants, smart phones, laptop computers, handheld computers, or other devices with wireless communication capabilities. The mobile communication network 10 comprises a plurality of geographic cell areas or sectors 12. Each geographic cell area or sector 12 is served by a base station 20, which is referred to in LTE as a NodeB or Enhanced NodeB (eNodeB). A single base station 20 may provide service in multiple geographic cell areas or sectors 12. The user terminals 100 receive signals from a serving base station 20 on one or more downlink (DL) channels, and transmit signals to the base station 20 on one or more uplink (UL) channels.

For illustrative purposes, several embodiments of the present invention will be described in the context of a Long-Term Evolution (LTE) system. Those skilled in the art will appreciate, however, that several embodiments of the present invention may be more generally applicable to other wireless communication systems, including, for example, WiMax (IEEE 802.16) systems.

Figure 2:
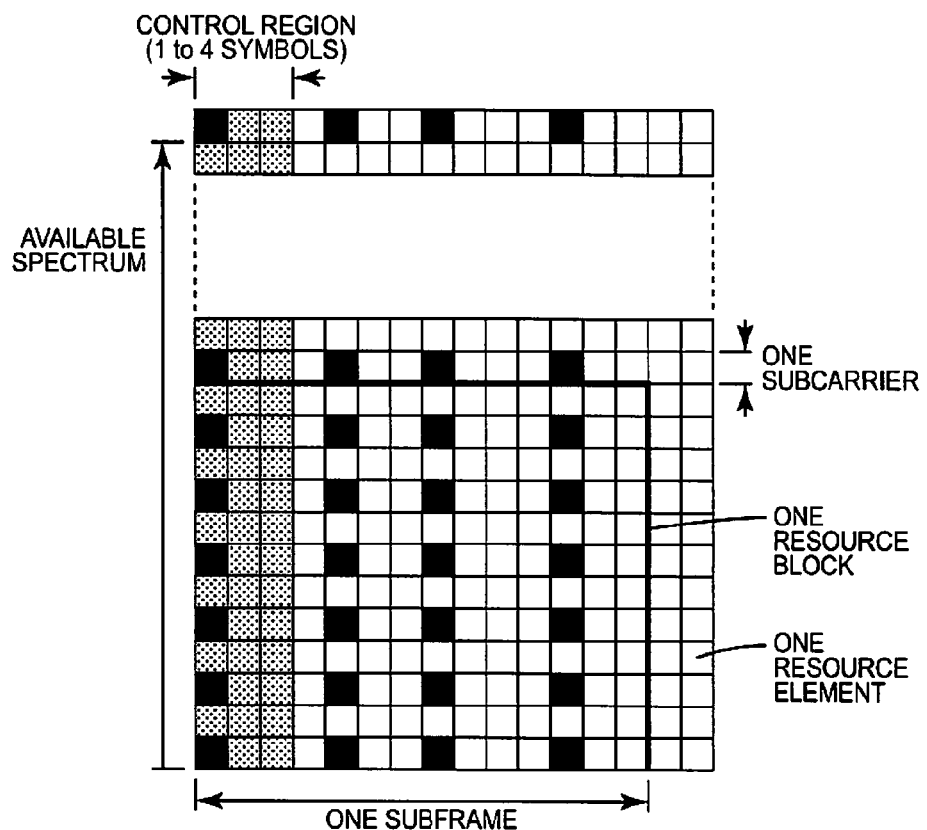
FIG. 2 illustrates a grid of time-frequency resources for an OFDM system.

LTE uses Orthogonal Frequency Division Multiplexing (OFDM) in the downlink and Discrete Fourier Transform (DFT)-spread OFDM in the uplink. The basic LTE downlink physical resource can be viewed as a time-frequency grid. FIG. 2 illustrates a portion of an exemplary OFDM time-frequency grid 50 for LTE. Generally speaking, the time-frequency grid 50 is divided into one millisecond subframes. Each subframe includes a number of OFDM symbols. For a normal cyclic prefix (CP) length, suitable for use in situations where multipath dispersion is not expected to be extremely severe, a subframe comprises fourteen OFDM symbols. A subframe comprises twelve OFDM symbols if an extended cyclic prefix is used. In the frequency domain, the physical resources are divided into adjacent subcarriers with a spacing of 15 kHz. The number of subcarriers varies according to the allocated system bandwidth. The smallest element of the time-frequency grid 50 is a resource element. A resource element comprises one OFDM subcarrier during one OFDM symbol interval.

Figure 3:
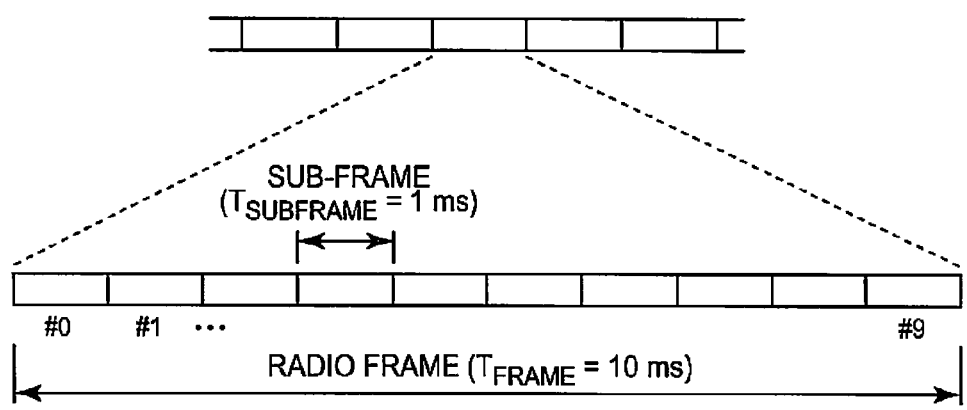
FIG. 3 illustrates the time-domain structure of an LTE signal.

As shown in FIG. 3, in the time domain, LTE downlink transmissions are further organized into radio frames of 10 milliseconds, each radio frame consisting of ten subframes. Each subframe can further be divided into two slots of 0.5 milliseconds duration. Furthermore, resource allocations in LTE are often described in terms of resource blocks, where a resource block corresponds to one slot (0.5 ms) in the time domain and twelve contiguous subcarriers in the frequency domain. Resource blocks are numbered in the frequency domain, starting with 0 from one end of the system bandwidth.

Downlink transmissions can be dynamically scheduled, in that in each subframe the base station transmits control information identifying the terminals to which data is transmitted and the resource blocks in which that data is transmitted, for the current downlink subframe. This control signaling is typically transmitted in the first one, two, three, or four OFDM symbols in each subframe. A downlink system with three OFDM symbols used for the control signaling is illustrated in FIG. 2. The dynamic scheduling information is communicated to the UEs ("user equipment," 3GPP terminology for a mobile station) via a Physical Downlink Control Channel (PDCCH) transmitted in the control region. After successful decoding of a PDCCH, the UE performs reception of the Physical Downlink Shared Channel (PDSCH) or transmission of the Physical Uplink Shared Channel (PUSCH) according to pre-determined timing specified in the LTE specifications.

For error control, LTE uses hybrid-ARQ (HARQ), where, after receiving downlink data in a subframe, the terminal attempts to decode it and reports to the base station whether the decoding was successful (ACK) or not (NACK) via the Physical Uplink Control Channel(PUCCH). In the event of an unsuccessful decoding attempt, the base station (evolved NodeB, or eNodeB, in 3GPP terminology) can retransmit the erroneous data. Similarly, the base station can indicate to the UE whether the decoding of the PUSCH was successful (ACK) or not (NACK) via the Physical Hybrid ARQ Indicator CHannel (PHICH).

The downlink Layer 1/Layer 2 (L1/L2) control signaling transmitted in the control region includes several different physical-channel types. First, a Physical Control Format Indicator Channel (PCFICH) is used to inform receiving mobile terminals about the size of the control region, e.g., whether one, two, or three OFDM symbols are dedicated to control signaling. There is one and only one PCFICH on each component carrier or, equivalently, in each cell. Second, a Physical Downlink Control Channel (PDCCH) is used to signal downlink scheduling assignments and uplink scheduling grants. Each PDCCH typically carries signaling for a single terminal, but can also be used to address a group of terminals. Multiple PDCCHs can exist in each cell. Finally, the Physical Hybrid-ARQ Indicator Channel (PHICH) is used by the eNodeB to signal hybrid-ARQ acknowledgements in response to uplink shared channel (UL-SCH) transmissions from the mobile terminal. Multiple PHICHs can exist in each cell.

Figure 4:
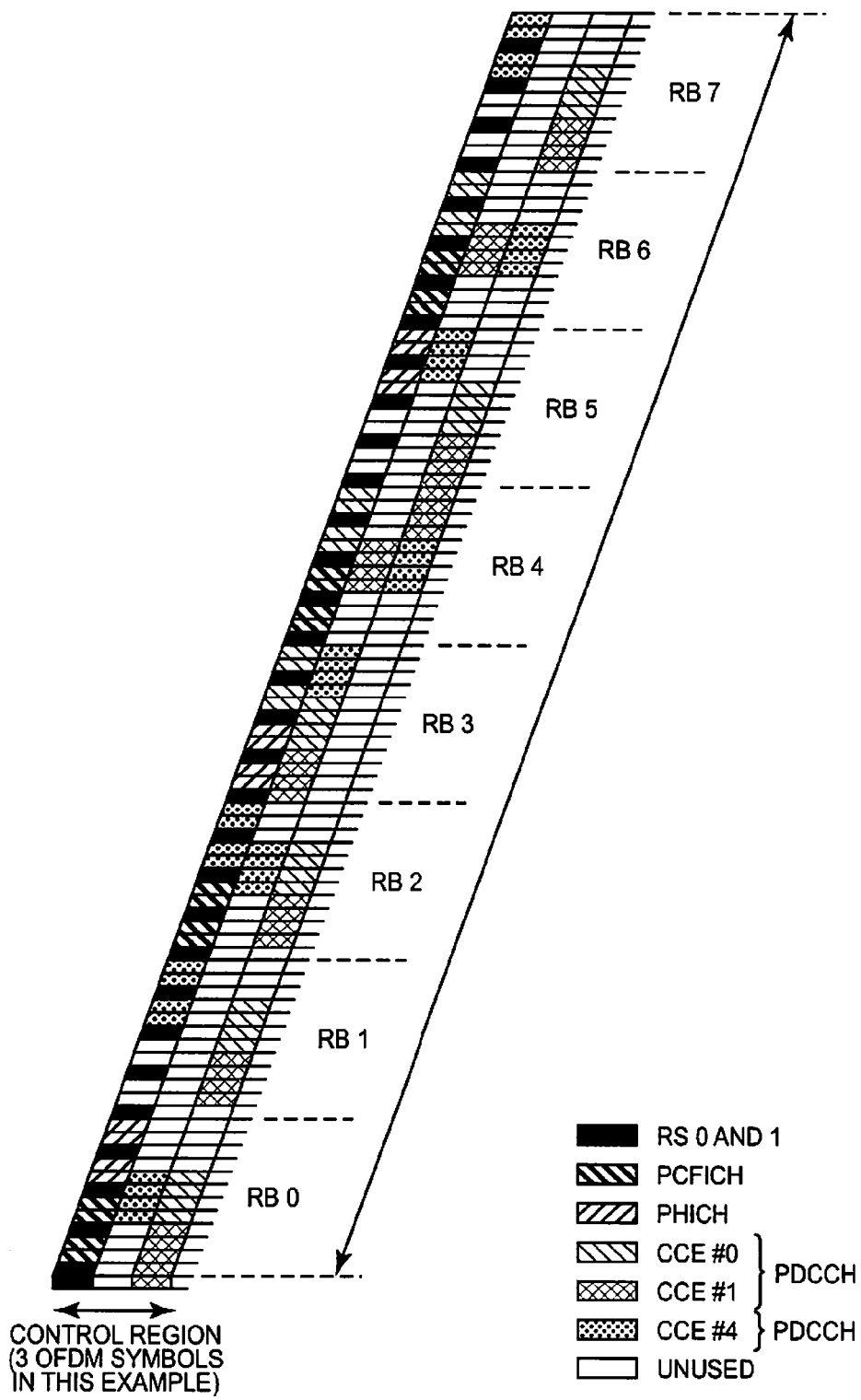
FIG. 4 illustrates details of the control region of an LTE downlink subframe.

These physical channels are organized in units of resource element group (REG), each of which consists of four closely spaced resource elements. The PCFICH occupies four REGs, distributed across the bandwidth of the carrier for frequency diversity purposes, while a PHICH group occupies three REGs. An illustration of the control channels can be seen in FIG. 4, which illustrates the LTE control region for a carrier bandwidth of 8 resource blocks.

Figure 5:
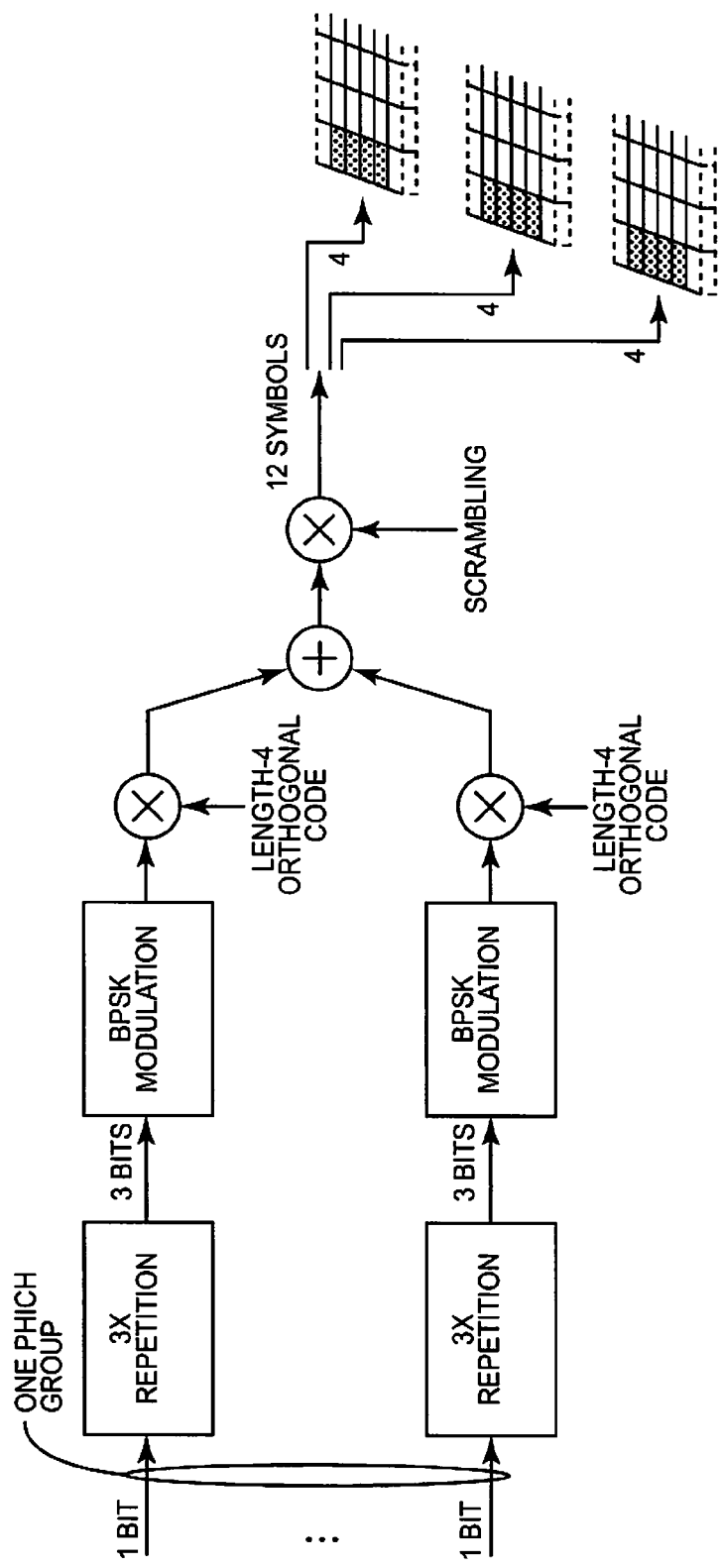
FIG. 5 illustrates encoding of the LTE PHICH channel.

The PHICH is used for transmission of hybrid-ARQ acknowledgements in response to UL-SCH transmission. There is one Hybrid-ARQ indicator transmitted per received transport block and transmit-time interval (TTI)—that is, when uplink spatial multiplexing is used on a component carrier, two Hybrid-ARQ indicators are used to acknowledge the transmission, one per transport block. For proper operation of the hybrid-ARQ protocol, the error rate of the PHICH should be sufficiently low. Therefore, it is preferable to encode and spread each indicator across multiple resource elements to capture frequency diversity. To fulfill this, a structure where several Hybrid-ARQ indicators are code multiplexed on to a set of resource elements is used in LTE, as shown in FIG. 5. The hybrid-ARQ acknowledgement (one single bit of information per transport block) is repeated three times, followed by BPSK modulation, on either the I or the Q branch, and spreading with a length-four orthogonal sequence.

A set of PHICHs transmitted on the same set of resource elements is called a PHICH group, where a PHICH group consists of eight PHICHs in the case of normal cyclic prefix. With this encoding scheme, an individual UE can be provided a single number that indicates where to find the resource/information addressing. Using this number, the UE can derive the PHICH group (time-frequency resources), orthogonal sequence (code) and I or Q (signal space), to recover individual PHICH bits from the PHICH group.

The Physical Downlink Control Channel (PDCCH) is used to carry downlink control information (DCI), which includes scheduling decisions (e.g., resource grants) and power-control commands. More specifically, one category of DCI includes downlink scheduling assignments, which in turn include PDSCH resource indication, transport format, hybrid-ARQ information, and control information related to spatial multiplexing (if applicable). A downlink scheduling assignment also includes a command for power control of the PUCCH used for transmission of hybrid-ARQ acknowledgements in response to downlink scheduling assignments. Another category of DCI includes uplink scheduling grants, which in turn include PUSCH resource indication, transport format, and hybrid-ARQ-related information. An uplink scheduling grant also includes a command for power control of the PUSCH. Still further, another category of DCI includes power-control commands for a set of terminals as a complement to the commands included in the scheduling assignments/grants.

One PDCCH carries one DCI message of one of the types briefly described above. Since multiple terminals can be scheduled simultaneously, on both downlink and uplink, there must be a possibility to transmit multiple scheduling messages within each subframe. Each scheduling message is transmitted on a separate PDCCH, and consequently there are typically multiple PDCCH transmissions within a given subframe, targeted to different mobile terminals, for each cell. Furthermore, to support different radio channel conditions, link adaptation can be used, where the code rate of the PDCCH is selected to match the radio-channel conditions.

To allow for simple yet efficient processing of the control channels in the terminal, the mapping of PDCCHs to resource elements is subject to a certain structure. This structure is based on Control-Channel Elements (CCEs), which each consist of nine REGs. (As noted earlier, each REG is made up of four resource elements.) One, two, four, or eight CCEs are used for a given PDCCH, depending on the payload size of the control information (DCI payload) and the channel-coding rate. This approach is used to permit link adaptation for the PDCCH; if the channel conditions for the terminal to which the PDCCH is targeted are disadvantageous, a larger number of CCEs may be used, compared to the case of advantageous channel conditions. The number of CCEs used for a PDCCH is often referred to as the aggregation level (AL).

The number of CCEs available for use in carrying PDCCHs depends on the size of the control region, the cell bandwidth, the number of downlink antenna ports, and the number of resources occupied by PHICH. The size of the control region can vary dynamically from subframe to subframe, as indicated by the PCFICH, whereas other quantities defining the control region are semi-statically configured. The CCEs available for PDCCH transmission are numbered from zero upward. A specific PDCCH can thus be identified by the numbers of the corresponding CCEs in the control region.

Figure 6:
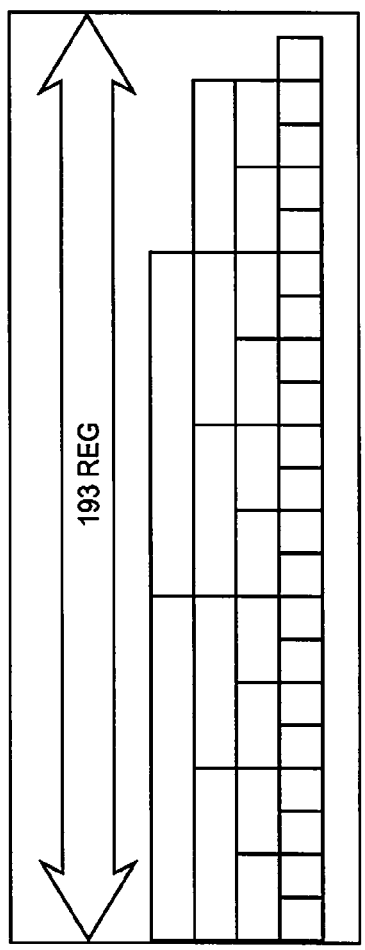
FIG. 6 illustrates the control region resources available for PDCCH after excluding reference symbols, PCFICH, and PHICH, in an example scenario.

An example of the CCEs available for PDCCH transmission in a given frame is illustrated in FIG. 6. Note that FIG. 6 illustrates available resources as grouped before REG interleaving (to be discussed in describing FIG. 7). In the example shown in FIG. 6, there are 193 REGs available for carrying PDCCH after the resources allocated to reference symbols, PCFICH and PHICH are excluded. As can be seen in this example configuration, it is possible to carry at most two AL=8 PDCCHs, or five AL=4 PDCCHs, ten AL=2 PDCCHs or twenty-one AL=1 PDCCHs. Note that there are 4 REGs left unavailable to any PDCCH, since nine REGs are needed to form a single CCE.

Figure 7:
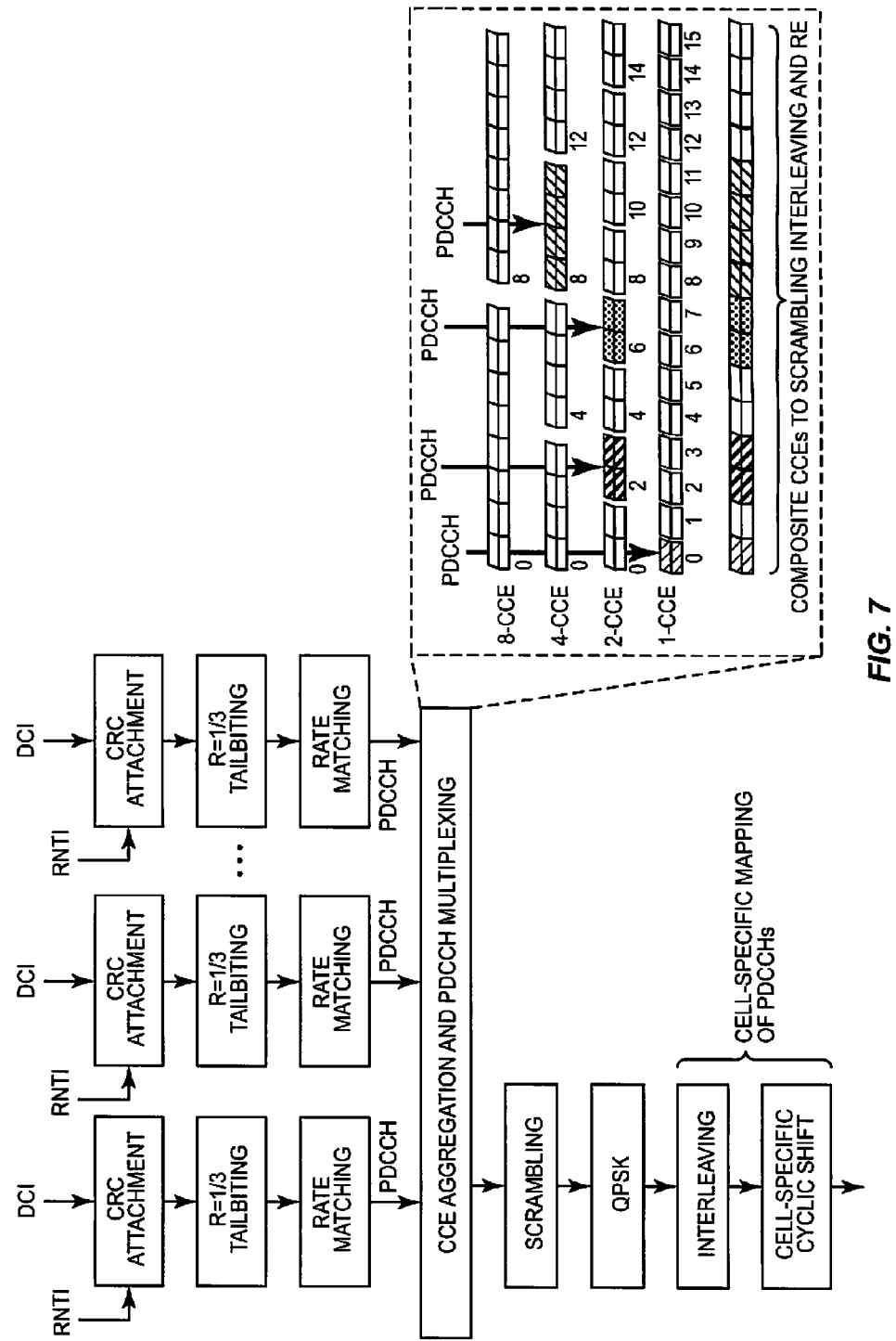
FIG. 7 illustrates the processing procedures for PDCCHs.

The network can select different aggregation levels and PDCCH positions for different UEs from the available PDCCH resources. For each PDCCH, as illustrated in FIG. 7, a cyclic redundancy check (CRC) is attached to each DCI message payload. The identity of the terminal (or terminals) addressed—that is, the RNTI—is included in the CRC calculation and is not explicitly transmitted. Depending on the purpose of the DCI message (e.g., unicast data transmission, power-control command, random-access response, etc.), different RNTIs are used. Thus, for normal unicast data transmission, a terminal-specific C-RNTI is used.

After CRC attachment, the bits are coded with a rate-1/3 tail-biting convolutional code and rate-matched to fit the amount of resources used for PDCCH transmission. After the PDCCHs for a given subframe are allocated to the desired resource elements (the details of which are given below), the sequence of bits for all the PDCCH resource elements to be transmitted in the subframe, including the unused resource elements, is scrambled by a cell-specific and subframe-specific scrambling sequence. This randomizes inter-cell interference. The scrambling is followed by QPSK modulation and mapping to resource elements. The entire collection of the REGs (including those unused by any PDCCH) is then interleaved across the entire control region to randomize inter-cell interference as well as to capture the benefits of frequency diversity for the PDCCHs.

3GPP's Release 10 of the LTE standards (LTE Release 10) has been published and provides support for bandwidths larger than 20 MHz, through the use of carrier aggregation. One important requirement placed on the development of LTE Release 10 specifications was to assure backwards compatibility with LTE Release 8. The need for spectrum compatibility dictated that an LTE Release 10 carrier that is wider than 20 MHz should appear as a number of distinct, smaller bandwidth, LTE carriers to an LTE Release8 terminal. Each of these distinct carriers can be referred to as a component carrier.

For early LTE Release 10 system deployments in particular, it can be expected that there will be a relatively small number of LTE Release 10-capable terminals, compared to many "legacy" terminals that conform to earlier releases of the LTE specifications. Therefore, it is necessary to ensure the efficient use of wide carriers for legacy terminals as well as Release 10 terminals, i.e., that it is possible to implement carriers where legacy terminals can be scheduled in all parts of the wideband LTE Release 10 carrier.

Figure 8:
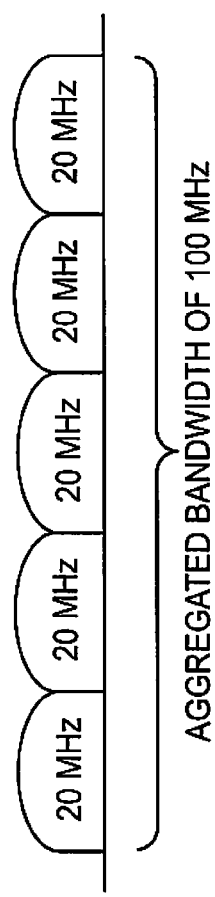
FIG. 8 illustrates several carriers aggregated to form an aggregated bandwidth of 100 MHz.

One straightforward way to obtain this is by means of a technique called carrier aggregation. With carrier aggregation, an LTE Release 10 terminal can receive multiple component carriers, where each component carrier has (or at least may have) the same structure as a Release 8 carrier. The basic concept of carrier aggregation is illustrated in FIG. 8, which illustrates the aggregation of five 20-MHz component carriers to yield an aggregated bandwidth of 100 MHz.

The number of aggregated component carriers as well as the bandwidth for each individual component carrier may be different for uplink and downlink. A symmetric configuration refers to the case where the number of component carriers in downlink and uplink is the same, whereas an asymmetric configuration refers to the case that the number of component carriers is different. It is important to note that the number of component carriers configured in a cell may be different from the number of component carriers actually seen or accessible to a given terminal. A terminal may, for example, support more downlink component carriers than uplink component carriers, even though the cell is configured with the same number of uplink and downlink component carriers.

During initial access, an LTE Release 10 terminal behaves similarly to an LTE Release 8 terminal, requesting and obtaining access to a single carrier for the uplink and downlink. Upon successful connection to the network a terminal may— depending on its own capabilities and the network—be configured with additional component carriers in the uplink (UL) and downlink (DL).

Even if a mobile terminal is configured with additional component carriers, it need not necessarily monitor all of them, all of the time. This is because LTE Release 10 supports activation of component carriers, as distinct from configuration. The terminal monitors for PDCCH and PDSCH only component carriers that are both configured and activated. Since activation is based on Medium Access Control (MAC) control elements—which are faster than RRC signaling—the activation/de-activation process can dynamically follow the number of component carriers that is required to fulfill the current data rate needs. All but one component carrier—the DL Primary component carrier (DL PCC)—can be deactivated at any given time.

Scheduling of a component carrier is done using the PDCCH, via downlink assignments. Control information on the PDCCH is formatted as a Downlink Control Information (DCI) message. In Release 8, where a terminal only operates with one DL and one UL component carrier, the association between DL assignment, UL grants, and the corresponding DL and UL component carriers is very clear. In Release 10, however, two modes of carrier aggregation need to be distinguished. The first mode is very similar to the operation of multiple Release 8 terminals, in that a DL assignment or UL grant contained in a DCI message transmitted on a component carrier applies either to the DL component carrier itself or to a uniquely associated UL component carrier (This association may be either via cell-specific or UE-specific linking.). A second mode of operation augments a DCI message with a Carrier Indicator Field (CIF). A DCI containing a DL assignment with CIF applies to the specific DL component carrier indicated by the CIF, while a DCI containing an UL grant with CIF applies to the indicated UL component carrier.

DCI messages for downlink assignments contain, among other things, resource block assignment, modulation and coding scheme related parameters, and HARQ redundancy version indicators. In addition to those parameters that relate to the actual downlink transmission, most DCI formats for downlink assignments also contain a bit field for Transmit Power Control (TPC) commands. These TPC commands are used to control the uplink power control behavior of the corresponding PUCCH that is used to transmit the HARQ feedback.

In Release 10 LTE, the transmission of PUCCH is mapped to one specific uplink component carrier, the UL primary component carrier (UL PCC). Terminals configured with only a single DL component carrier (which is then the DLPCC) and UL component carrier (which is then the UL PCC) are operating dynamic ACK/NACK on PUCCH according to the same processes specified by the Release 8 standards. The time-frequency resource location of the first Control Channel Element (CCE) used to transmit PDCCH for a particular DL assignment determines the dynamic ACK/NACK resource on Release 8 PUCCH. Because only one DL component carrier is cell-specifically linked with the UL PCC, no PUCCH collisions can occur, since all PDCCH for a given subframe are transmitted using a different first CCE.

Transmission and reception to and from a node, e.g., a terminal in a cellular system such as LTE, can be multiplexed in the frequency domain or in the time domain (or both). With frequency division duplexing (FDD), downlink and uplink transmission take place in different, sufficiently separated, frequency bands. With time division duplexing (TDD), downlink and uplink transmission take place in different, non-overlapping time slots. Thus, TDD can be used with unpaired spectrum, whereas FDD requires paired spectrum. Both modes are supported by LTE standards.

Figure 9:
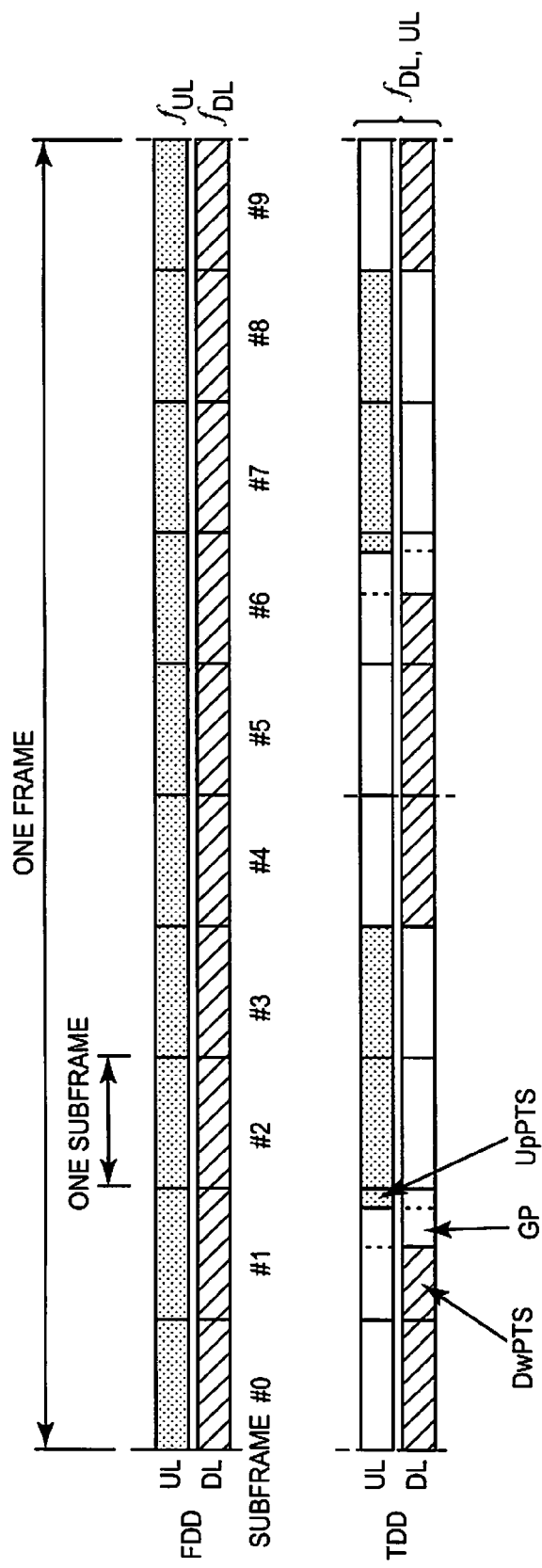
FIG. 9 illustrates the uplink/downlink time-frequency structure for an LTE signal in FDD and TDD systems.

Typically, the structure of the transmitted signal in a communication system is organized in the form of a frame structure. LTE uses ten equally-sized, one-millisecond subframes per radio frame as illustrated in FIG. 9. In the case of FDD operation (upper part of FIG. 9) there are two carrier frequencies, one for uplink transmission (f-UL) and one for downlink transmission (f-DL). With respect a given terminal in a cellular communication system, FDD can be either full-duplex or half-duplex. In the full-duplex case, a terminal can transmit and receive simultaneously. In half-duplex operation, the terminal cannot transmit and receive simultaneously. However, the base station is typically capable of simultaneous reception/transmission, e.g., receiving from one terminal while simultaneously transmitting to another terminal. In LTE, a half-duplex terminal generally monitors/receives in the downlink, except when explicitly instructed to transmit in a particular subframe.

In the case of TDD operation (lower part of FIG. 9), there is only a single carrier frequency, and uplink and downlink transmissions are separated in time. Since the same carrier frequency is used for uplink and downlink transmission, both the base station and the mobile terminals need to switch from transmission mode to reception mode and vice-versa.

An essential aspect of any TDD system is to provide the possibility for a sufficiently large guard time where neither downlink nor uplink transmissions occur. This is required to avoid interference between uplink and downlink transmissions. For LTE, this guard time is provided by special subframes (subframe 1 and, in some cases, subframe 6), which are split into three parts: a downlink part (DwPTS), a guard period (GP), and an uplink part (UpPTS). These features are illustrated in the lower part of FIG. 9. The remaining subframes are either allocated to uplink or downlink transmission.

Figure 10:
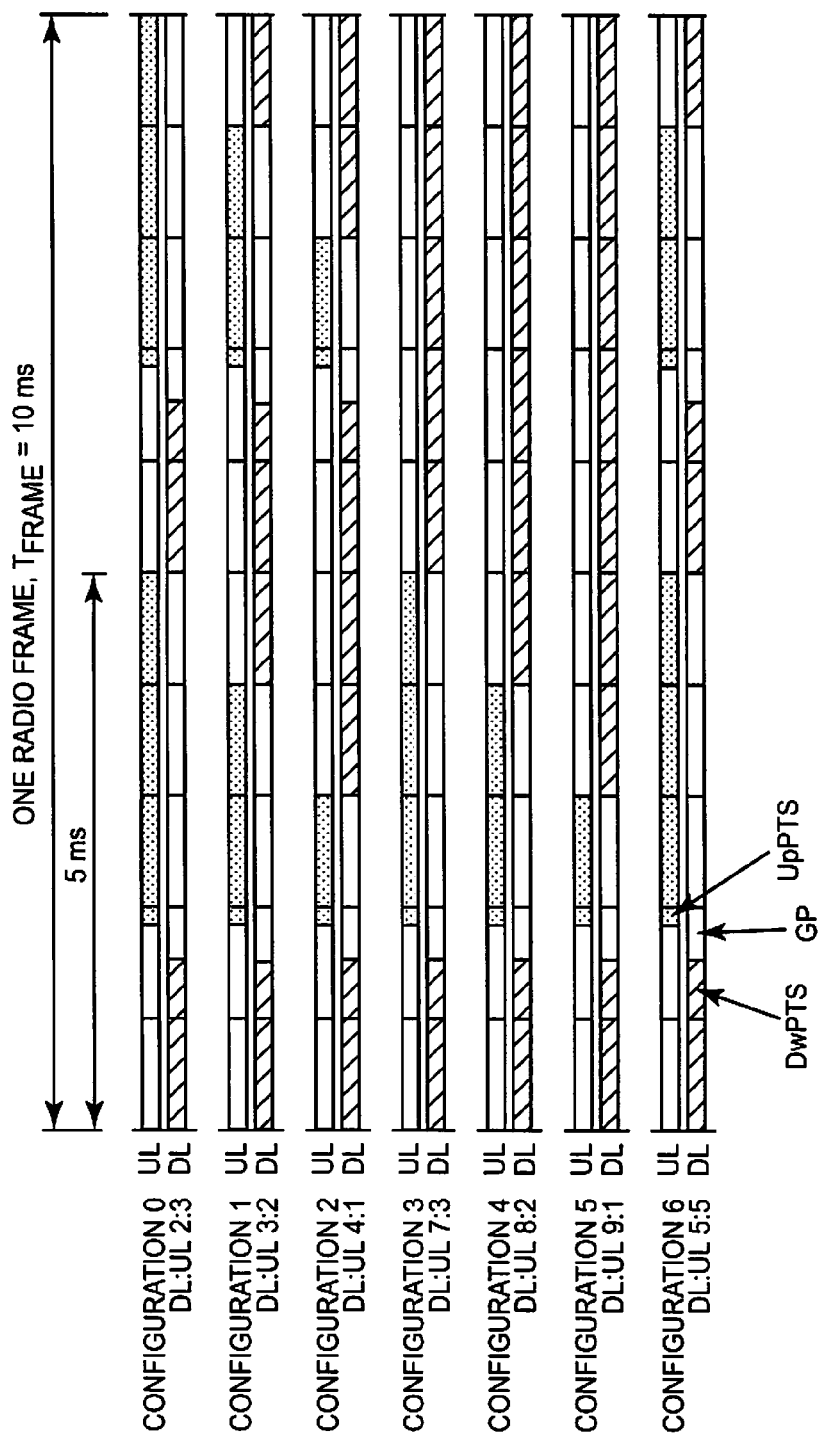
FIG. 10 illustrates different downlink/uplink configurations for TDD frames in an LTE system.

TDD allows for different asymmetries in terms of the amount of resources allocated for uplink and downlink transmission, respectively, by means of different downlink/uplink configurations. In LTE, there are seven different configurations as shown in FIG. 10. Note that in the following discussion, a DL subframe can mean either a normal DL subframe or the special subframe described above.

Figure 11:
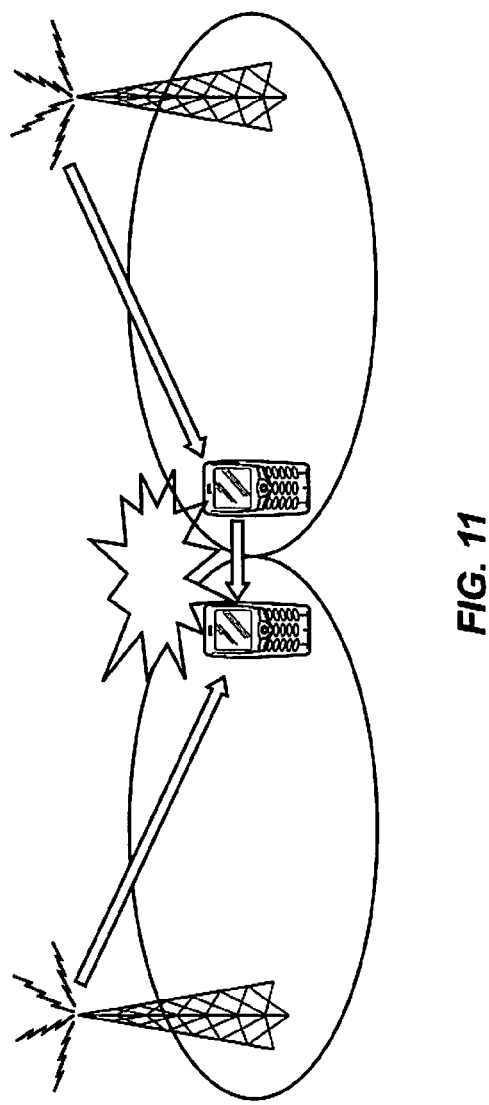
FIG. 11 illustrates uplink/downlink interference in a TDD system having incompatible configurations in neighboring cells.

To avoid severe interference between downlink and uplink transmissions among different cells, neighbor cells should have the same downlink/uplink configuration. If this is not done, uplink transmission in one cell may interfere with downlink transmission in the neighboring cell (and vice versa) as illustrated in FIG. 11. Hence, downlink/uplink asymmetry typically does not vary between cells, but is signaled as part of the system information and remains fixed for a long period of time.

For LTE, the timings for HARQ ACK/NACK (A/N) feedbacks for the PUSCH and the PDSCH as well as the grant of PUSCH are specified by extensive tables and procedure descriptions for each UL/DL configurations in 3GPP TS 36.213, "Evolved Universal Terrestrial Radio Access (E-UTRA); Physical layer procedures," v. 10.3.0 (September 2011).

These standards specify that for TDD UL/DL configurations 1-6 and normal HARQ operation, the UE shall, upon detection in subframe n of a PDCCH intended for the UE and having an uplink DCI format and/or a PHICH transmission, adjust the corresponding PUSCH transmission in subframe n+k, where k is given in Table 1, according to the PDCCH and PHICH information.

TABLE 1

| TDD UL/DL Configuration | \multicolumn{10}{c|}{subframe number n} |
|---|---|---|---|---|---|---|---|---|---|---|

| Configuration | 0 | 1 | 2 | 3 | 4 | 5 | 6 | 7 | 8 | 9 |
|---|---|---|---|---|---|---|---|---|---|---|
| 0 |  | 4 | 6 |  |  | 4 | 6 |  |  |  |
| 1 |  |  | 6 |  | 4 |  |  | 6 |  | 4 |
| 2 |  |  |  | 4 |  |  |  |  | 4 |  |
| 3 |  | 4 |  |  |  |  |  |  | 4 | 4 |
| 4 |  |  |  |  |  |  |  |  | 4 | 4 |
| 5 |  |  |  |  |  |  |  |  | 4 |  |
| 6 |  | 7 | 7 |  |  |  | 7 | 7 |  | 5 |

For TDD UL/DL configuration 0 and normal HARQ operation, the UE shall, upon detection in subframe n of a PDCCH intended for the UE and having an uplink DCI format and/or a PHICH transmission, adjust the corresponding PUSCH transmission in subframe n+k if the most-significant bit (MSB) of the UL index in the PDCCH with uplink DCI format is set to 1 or PHICH is received in subframe n=0 or 5 in the resource corresponding to I_PHICH=0, with k given in Table 1. If, for TDD UL/DL configuration 0 and normal HARQ operation, the least-significant bit (LSB) of the UL index in the DCI format 0/4 is set to 1 in subframe n or a PHICH is received in subframe n=0 or 5 in the resource corresponding to I_PHICH=0, or PHICH is received in subframe n=1 or 6, the UE shall adjust the corresponding PUSCH transmission in subframe n+7. If, for TDD UL/DL configuration 0, both the MSB and LSB of the UL index in the PDCCH with uplink DCI format are set in subframe n, the UE shall adjust the corresponding PUSCH transmission in both subframes n+k and n+7, with k given in Table 1.

For PUSCH transmissions scheduled from serving cell c in subframe n, a UE shall determine the corresponding PHICH resource of serving cell c in subframe n+k_PHICH, where k_PHICH is given in Table 2 for TDD. For subframe bundling operation, the corresponding PHICH resource is associated with the last subframe in the bundle.

TABLE 2

| TDD UL/DL Configuration | 0 | 1 | 2 | 3 | 4 | 5 | 6 | 7 | 8 | 9 |
|---|---|---|---|---|---|---|---|---|---|---|
| 0 |  |  | 4 | 7 | 6 |  |  | 4 | 7 | 6 |
| 1 |  |  | 4 | 6 |  |  |  | 4 | 6 |  |
| 2 |  |  | 6 |  |  |  |  | 6 |  |  |
| 3 |  |  | 6 | 6 | 6 |  |  |  |  |  |
| 4 |  |  | 6 | 6 |  |  |  |  |  |  |
| 5 |  |  | 6 |  |  |  |  |  |  |  |
| 6 |  |  | 4 | 6 | 6 |  |  | 4 | 7 |  |

Since PUSCH HARQ feedbacks are transmitted in a subset of subframes, there is no need to reserve radio resources for PHICH in the other subframes. For instance, in a TDD UL/DL cell of configuration 1, subframes 0, 2, 3, 5, 7 and 8 have no PHICH resources. In a TDD UL/DL cell of configuration 2, subframes 0, 1, 2, 4, 5, 6, 7 and 9 have no PHICH resources.

In LTE Release 10, carrier aggregation of TDD cells is specified with the restriction that the UL/DL configurations for all the aggregated cells are identical. As discussed above, the UL/DL configurations of neighboring cells should generally be compatible, to avoid severe interference problems. However, there are cases where the neighboring cells are operated by different operators or different wireless systems. The LTE TDD cells adjacent to those neighboring systems are hence required to adopt certain compatible UL/DL configurations. As a result, an operator may have several TDD cells having different UL/DL configurations on different frequencies.

Figure 12:
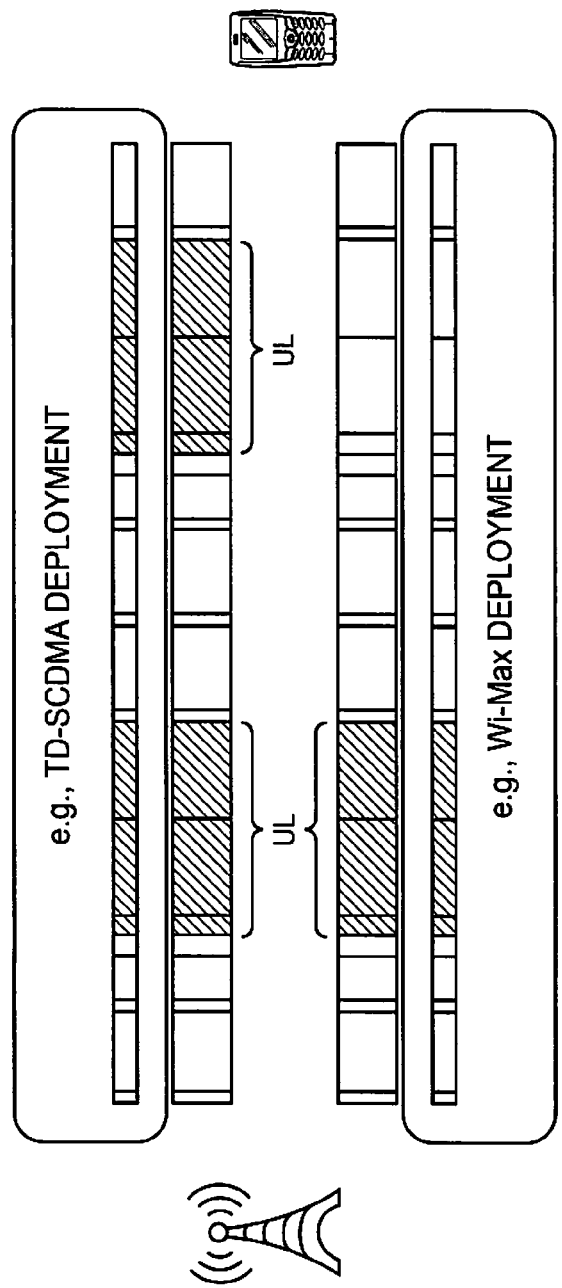
FIG. 12 illustrates carrier aggregation of TDD cells with different uplink/downlink configurations.

An example of this can be seen in FIG. 12, which illustrates different UL/DL configurations on each of the two LTE carriers shown in the center of the figure. This configuration is necessary for the LTE carriers to coexist with a TD-SCDMA network that is close in frequency to the upper LTE carrier, and at the same time to coexist with a WiMAX system that is close to the lower LTE carrier. This is only one motivation for having different configurations on different aggregated LTE carriers; there may be other reasons as well.

A further complication from such aggregation cases is that the nominally TDD UE may be required to transmit and receive simultaneously in certain subframes (such as subframes 7 and 8 in FIG. 12, where the upper and lower LTE carriers have different configurations). Such FDD-like operations are incompatible with existing designs of TDD UEs. Enabling such full-duplex operations in UEs may impose additional UE complexity and costs. It is therefore necessary to also consider the possibility of allowing half-duplex operations during such conflicting subframes. That is, the UE should be instructed to perform either reception or transmission, but not both, during such conflicting subframes.

In Release 10 of the LTE specifications, the HARQ control timings for all of the component carriers are determined in the same manner described above, but based on the UL/DL configuration number for the PCC (i.e., primary cell, or Pcell). This specification of HARQ operations works in LTE Release 10 because all aggregated TDD cells have identical UL/DL configuration. However, a straight forward extension of this operation to aggregation of different UL/DL configurations proves difficult.

Figure 13:
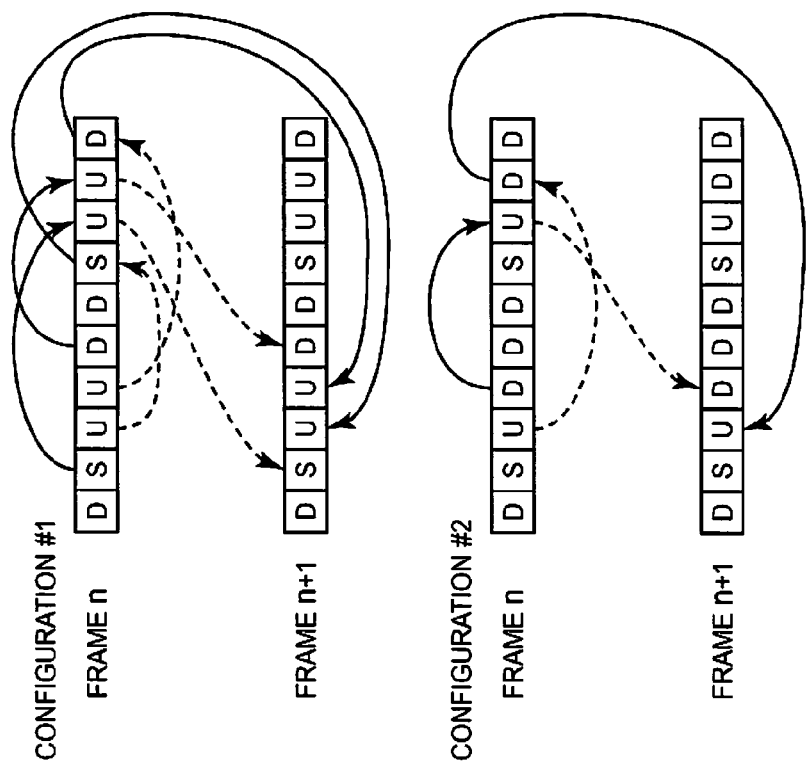
FIG. 13 illustrates PUSCH grant and ACK/NACK feedback timings for a configuration 1 TDD cell and a configuration 2 TDD cell.

Consider a PUSCH grant and A/N feedback timing example for aggregating a configuration 1 cell and a configuration 2 cell, as illustrated in FIG. 13, where "D" specifies downlink subframes, "U" specifies uplink subframes, and "S" specifies special subframes. The solid lines indicate the timings for PUSCH grants, while dashed lines indicate the timings for A/N feedback. If the configuration 1 cell is the Pcell, PUSCH grant and A/N feedback for the configuration 2 secondary cell (Scell) can be fed back based on the timing rules of Pcell. This is because each uplink subframe in a configuration 2 cell corresponds directly to an uplink subframe in a configuration 1 cell. However, if the configuration 2 cell is the Pcell, PUSCH cannot be scheduled for subframe 3 and 8 in the configuration 1 Scell, because there is no such UL grant timing in configuration 2. A/N feedback timing rules for these two subframes are not available, either.

This problem has been addressed in a related patent application, U.S. provisional patent application Ser. No. 61/522, 698. The solutions described therein allow the UL and DL HARQ control and A/N feedback information to be transmitted in non-conflicting subframes that are available across all aggregated component carriers. This feature enables better component carrier load balancing since the HARQ control and A/N feedback timings are symmetric across component carriers (i.e., any of the component carriers can serve as the Pcell). For half-duplex UEs, this prevents HARQ control from blocking UL/DL scheduling freedom of conflicting subframes.

Figure 14:
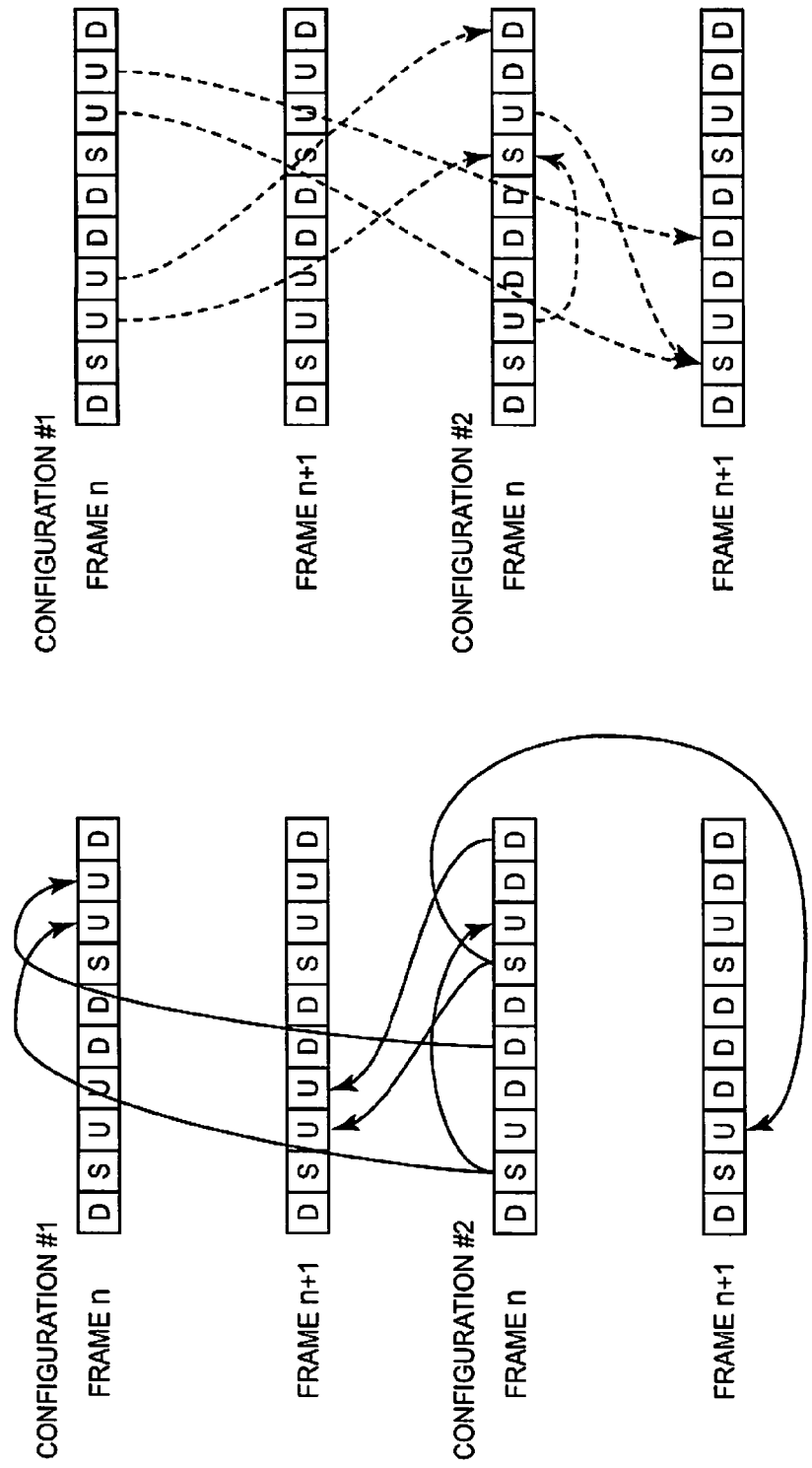
FIG. 14 illustrates PUSCH grant and ACK/NACK feedback timings for aggregation of a configuration 2 cell as primary cell and a configuration 1 cell as secondary cell.

The PUSCH grant and A/N feedback timings for aggregation of a configuration 2 cell as Pcell and a configuration 1 cell as Scell are illustrated in FIG. 14. Again, solid lines indicate timing for PUSCH grants, while dashed lines indicate A/N feedback timings. This analysis shows that all the UL subframes can be scheduled either from the Pcell (if cross-carrier scheduling is configured) or from the Scell itself (if cross-carrier scheduling is not configured). Furthermore, A/N feedback timings for all UL subframes are clearly assigned.

As can be seen in FIG. 14, with the solution described above to support LTE Release 11 interband TDD carrier aggregation with different UL/DL configurations, HARQ feedbacks for PUSCHs are scheduled to be transmitted from the network to the UE in subframes 1, 4, 6 and 9. However, according to the current Release 10 specifications, an LTE TDD cell with UL/DL configuration 2 has PHICH resources available only in subframes 3 and 8, as seen in the lower part of FIG. 13. Accordingly, there is a need to provide additional PUSCH HARQ feedback methods. Furthermore, providing carrier aggregation with a carrier of UL/DL configuration 1 and UL/DL configuration 2 is only one example of where this problem arises. The same problem would also arise if other combinations of component carriers with different UL/DL configurations are aggregated.

Furthermore, there are alternative solutions to support Release 11 interband TDD carrier aggregation with different UL/DL configurations. A need to provide additional PUSCH HARQ feedback methods can also be identified for these solutions. Still further, it should be noted that the identified PHICH difficulties can arise in FDD system, too. In Release 10 carrier aggregation, if cross-component carrier scheduling is configured, PHICH feedbacks are carried on the cell that sends the UL grant. Since there are other PHICH signals that need to be sent to UEs in this Pcell, there may be collision of PHICH resources. The current solution in Release 10 is for the eNB to assign different first UL resource block (RB) and different UL cyclic shift to avoid PHICH collision, or simply to avoid scheduling certain UEs. This approach makes the scheduler more complicated and can reduce system efficiency.

Accordingly, techniques are needed to provide additional Hybrid-ARQ indication resources for LTE TDD subframes that are normally without conventional LTE PHICH resources or that have too few LTE PHICH resources. The following discusses several such techniques, many of which are also applicable to FDD subframes with too few conventional LTE PHICH resources. These methods may be implemented in an LTE eNB supporting carrier aggregation or in a similar node in other wireless systems having Hybrid-ARQ resource indicator resource needs similar to those discussed above.

In some embodiments of the techniques disclosed herein, a modified PHICH is created using unused REGs in the control region of the downlink subframe. In another group of embodiments, a modified PHICH resides within the resources of an AL=1 PDCCH. Note that normal PDCCH encoding and modulation processes are not used for these embodiments. In another set of embodiments, the PUSCH HARQ feedback bits are carried by a conventional LTE PDCCH. This type of PDCCH is distinguished from other PDCCHs by scrambling it with a new type of RNTI: HARQ indicator Radio-network temporary identifier (HI-RNTI). In still other embodiments, the modulation symbols of PHICH are then placed on top of those normally reserved for PDCCHs. For such overlapped radio resources, the modulation symbols from the modified PHICH will replace those from normal PDCCHs for transmission. Alternatively, the modulation symbols for the modified PHICH and normal PDCCHs are both transmitted. As discussed below, two or more of these techniques may be combined, in some embodiments, to provide additional or more flexible capacity for transmitting PHICH.

Corresponding methods for implementation in a UE or other radio access terminal follow directly from the above-summarized techniques. More particularly, these methods comprise receiving a signal that includes subframes modified according to one or more of the above techniques, and retrieving PHICH signals from the received subframes by reversing the techniques used to encode them. Also following directly from the above-summarized techniques are apparatus configured to carry them out, including base station apparatus comprising processing circuits arranged to implement the techniques described in detail below, as well as mobile terminal apparatus, also comprising processing circuits and arranged to carry out the complementary methods for receiving PHICH signals.

As currently specified by Release 10 standards, an LTE downlink subframe is constructed by first mapping a Physical Control Format Indicator Format Channel (PCFICH) to the first symbol of the control region of the subframe. As discussed above, the PCFICH indicates the size of the control region, which may vary in size from one subframe to another. The PCFICH is subject to enhanced coding and may be slightly boosted in power, to ensure that it is reliably received and decoded.

Next, one or more conventional Physical Hybrid-ARQ Indicator Channels (PHICHs) are also mapped to the control region of the downlink subframe. It should be noted that not every downlink subframe necessarily includes a PHICH. For instance, one or several downlink subframes per frame in certain TDD UL/DL configurations may not carry PHICH resources. Further, downlink subframes for secondary component carriers in certain future releases of LTE FDD systems may also lack PHICH.

After the PHICH, if any, and the PCFICH are mapped to the control region of a subframe, one or more Physical Downlink Control Channels (PDCCHs) for carrying resource grant information are formed, by aggregating control channel elements (CCEs) and allocating the aggregated CCEs to first resource element groups (REGs), each REG representing four available resource elements of the control region of the downlink subframe. These REGs are then mapped to the control region of the downlink subframe, using the techniques illustrated in FIG. 7.

In several embodiments of the present invention, the lack of PHICH resources on certain subframes is addressed through the creation of a new, modified PHICH for carrying additional Hybrid-ARQ indicators. In addition to providing HARQ indicator resources for subframes that have none, this modified PHICH can also be used to supplement conventional PHICH resources, i.e., to provide additional HARQ indicators beyond those provided by one or more conventional PHICHs on a given subframe.

To maintain compatibility with Release 10 UEs, the modified PHICH resources are mapped to the OFDM structure of the downlink subframe after the PDCCHs are assembled. This is illustrated in the process flow diagram of FIG. 15.

The illustrated technique begins, as shown at block 1510, with the mapping of the PCFICH to first resource elements in the control region of the downlink subframe, followed by the (optional) mapping of one or more conventional PHICHs to the control region, as shown at block 1520. Next, as shown at block 1530, the PDCCHs are assembled, by aggregating CCEs as described earlier, and the aggregated CCEs are allocated to first REGs, with each REG representing four available resource elements of the control region of the downlink subframe.

Figure 15:
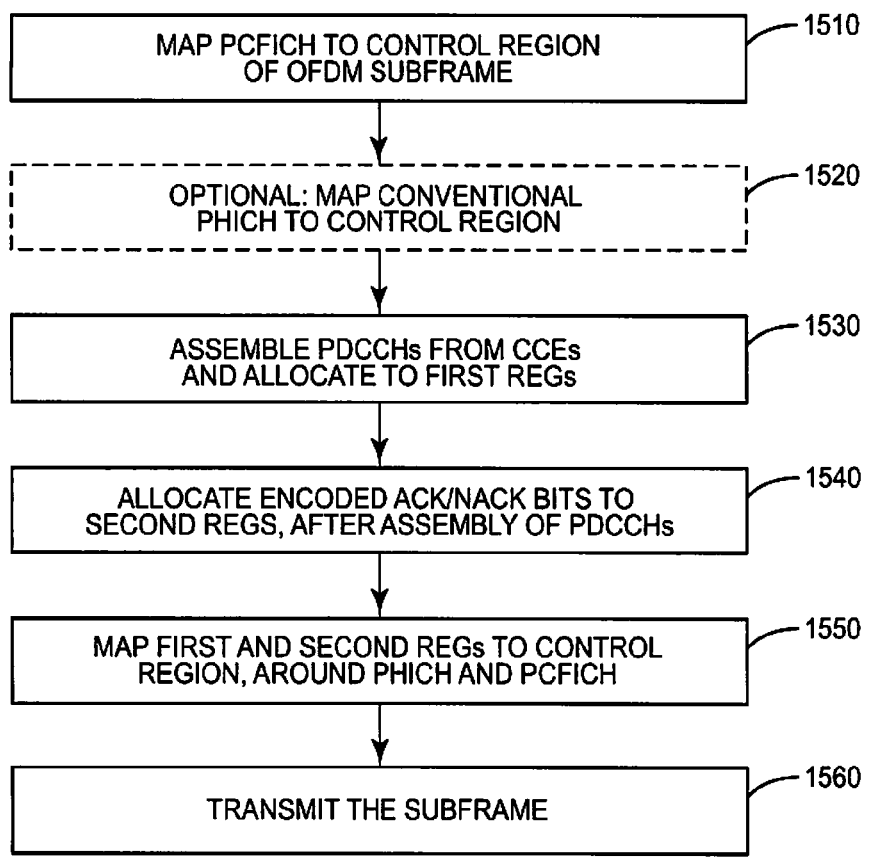
FIG. 15 is a process flow diagram illustrating an example technique for providing Hybrid-ARQ signaling in a downlink carrier signal.

After the PDCCHs have been assembled, the technique continues with the allocation of an encoded group of Hybrid-ARQ indicators, i.e., the modified PHICH, to a plurality of second REGs, as shown at block 1540. It should be noted that while FIG. 15 illustrates that the modified PHICH are allocated to the second REGs after the PDCCHs are assembled, this is not necessarily the case in all embodiments. In some embodiments, for example, the total number of REGs that are needed for carrying PDCCHs is known, in which case a suitable number of REGs can be set aside for carrying the modified PHICH before the PDCCHs are assembled. In other embodiments, symbols carrying modified PHICH are combined with symbols carrying PDCCH data. Again, in these embodiments REGs may be set aside for carrying modified PHICH before the PDCCHs are assembled.

Referring once again to FIG. 15, the first and second REGs, carrying the PDCCHs and the modified PHICH, are mapped onto the control region of the first subframe, around the resource elements used by the PHICHs, if present, and the PCFICH, as shown at block 1550. After the data region of the subframe is populated with data for UEs (not shown), the downlink subframe is transmitted, as shown at block 1560.

Figure 16:
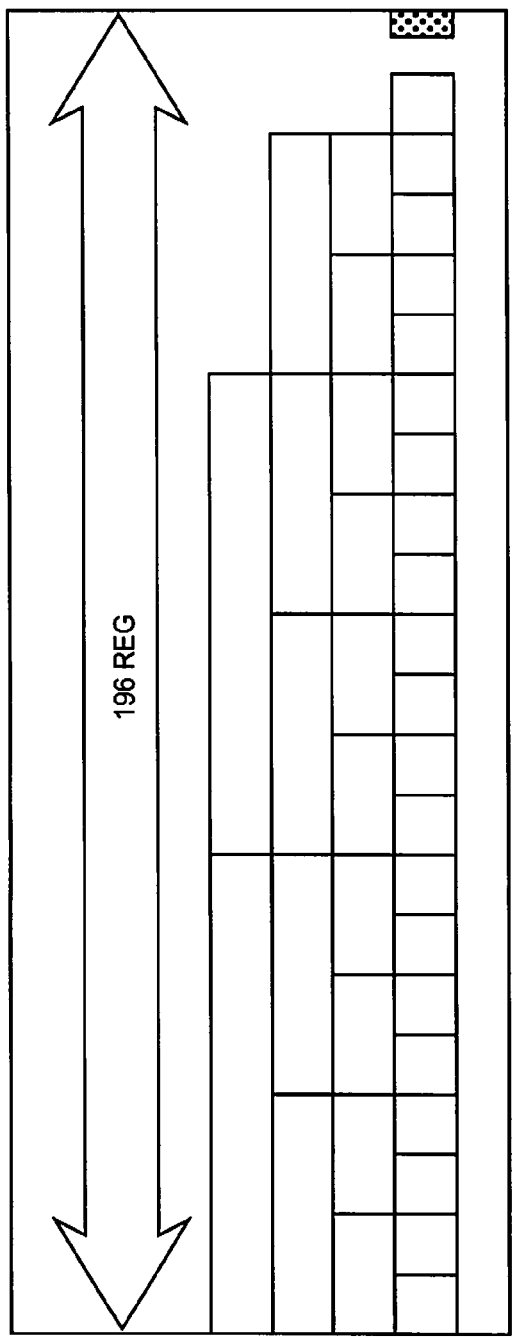
FIG. 16 illustrates the placement of modified PHICH resources in the control region of an OFDM downlink subframe after excluding reference symbols, PCFICH, and PHICH.

In several embodiments, the second REGs, which carry the new, modified PHICH, are REGs that are not used by PDCCHs that carry resource grant information. Indeed, in some cases the modified PHICH is placed in REGs that are inaccessible to PDCCHs. An example of such a scenario is shown in FIG. 16, which illustrates a scenario corresponding to a 5 MHz system bandwidth and three OFDM symbols for control. As shown in FIG. 16, there are 196 REGs in the control region after excluding reference symbols and PCFICH. It should be noted that there are three more available REGs than shown in FIG. 6, because there is no conventional PHICH resource in the subframe represented by FIG. 16.

In this case, there are eight REGs left inaccessible to any PDCCHs, since it takes nine REGs to form a CCE. Therefore, it is possible to assign three (or more) of these unused REGs to a modified PHICH that supports PUSCH HARQ feedback in a subframe that normally has no conventional LTE PHICH.

The encoding and modulation processes for the new modified PHICHs can follow the technique illustrated in FIG. 5. Thus, up to eight Hybrid-ARQ indicator bits are encoded, modulated, and scrambled to form twelve BPSK symbols. The resulting encoded and spread BPSK symbols can be placed in the unused REGs in any of several different ways. As illustrated in FIG. 16, the new modified PHICH is placed in the high REG index region. The three REGs of the new modified PHICH can be placed in consecutive REGs, in some embodiments, or one or more unused REGs can be left between the three REGs of the modified PHICH. In some cases, the three REGs of the new modified PHICH are placed right next to the last usable AL=1 PDCCH, while in others the three REGs of the new modified PHICH are placed at the very end of the available REGs, as shown in FIG. 16. Frequency diversity and inter-cell interference randomization of the new modified PHICH is enabled by interleaving the entire collection of REGs, i.e., the REGs that carry PDCCHs as well as the new modified PHICH, along with cell-specific cyclic shifting.

Since a conventional LTE subframe with no conventional PHICH should have at least three more REGs than a conventional LTE subframe with conventional PHICH, this solution will have no impact on the available PDCCH capacity. Furthermore, this solution will have no impact on "legacy" UEs, while allowing new UEs to be configured to receive the subframe containing the "extra" PHICH formed according to the techniques described above and placed in the otherwise unused REGs, and to use the ACK/NACK information included therein in their normal HARQ processing.

As an alternative to using only REGs that are inaccessible to PDCCHs, REGs that are not used by PDCCHs that carry resource grant information may be used. In some cases, for example, the modified PHICH group may be carried within the resources of an AL=1 PDCCH, which consists of a single CCE. Since 9 REGs are available within an AL=1 PDCCH, up to three new modified PHICH groups coded according to the technique illustrated in FIG. 5 can be accommodated in a single AL=1 PDCCH.

Figure 17:
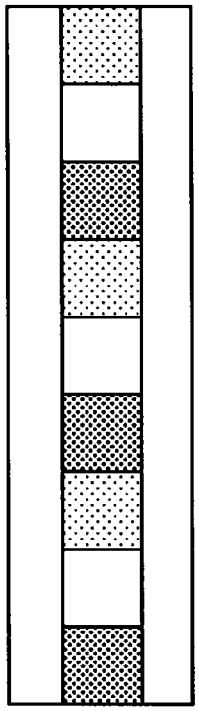
FIG. 17 illustrates the placement of modified PHICH within an AL=1 PDCCH.
Figure 17:
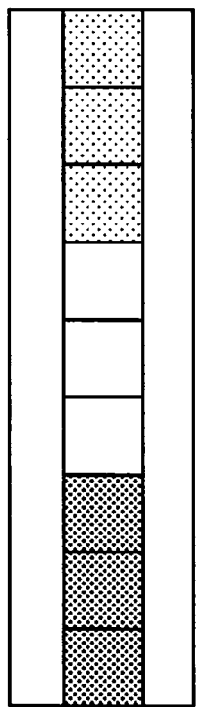

FIG. 17 illustrates alternative approaches to placing the REGs carrying the encoded HARQ indicators of the modified PHICH in the nine REGs of an AL=1 PDCCH. As shown in FIG. 17A, the three REGs of the new modified PHICH can be placed in consecutive REGs. Alternatively, the three REGs of the new modified PHICH can be placed in nonconsecutive REGs, as shown in FIG. 17B. If more than one modified PHICH group is carried by the AL=1 PDCCH, then this second approach results in interlacing of the REGs making up the multiple modified PHICHs; otherwise unused REGs are left between the three REGs of the first modified PHICH.

Figure 18:
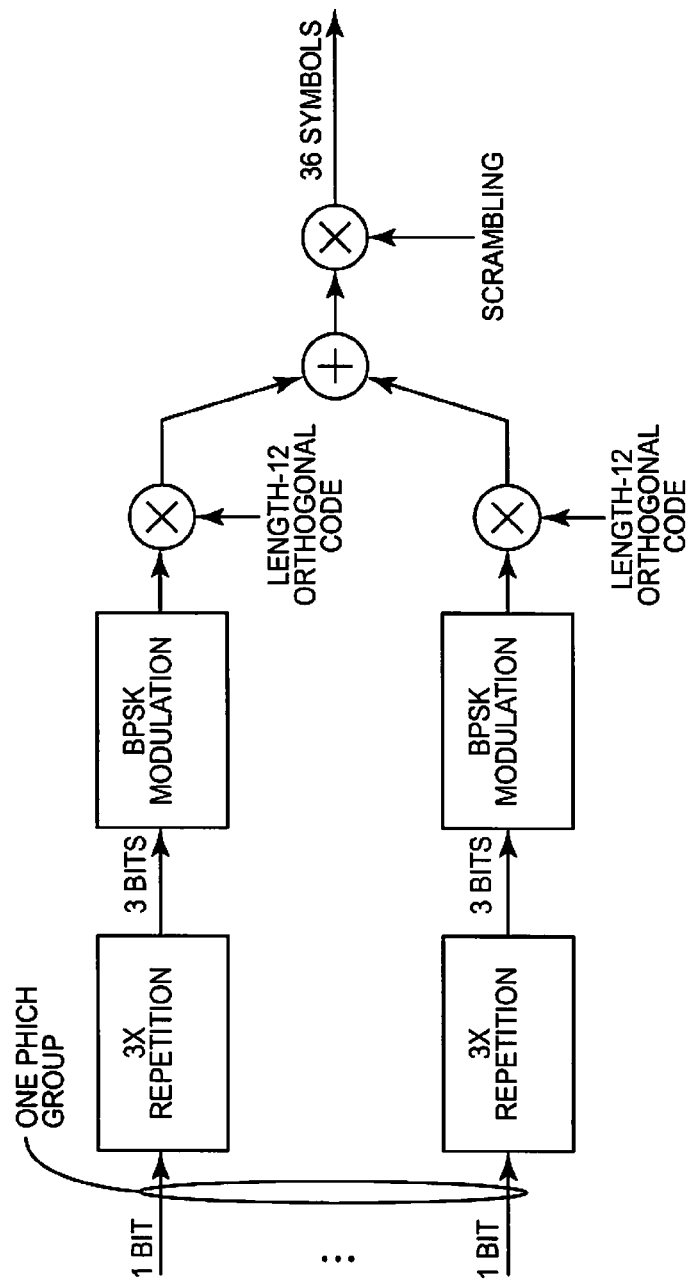
FIG. 18 illustrates an example modified encoding and modulation process for modified PHICH.

In another exemplary implementation, the encoding and modulation processes can be modified to take into consideration the enlarged available resources. In one non-limiting example, shown in FIG. 18, the length of the orthogonal code used to spread the repeated HARQ indicator bits can be increased to 12, from the length-4 code used in conventional PHICH processing. As a result, 36 modulation symbols are produced; these 36 modulation symbols fit neatly inside the AL=1 PDCCH resources. As with the technique discussed earlier, frequency diversity and inter-cell interference randomization of the new modified PHICH is enabled by interleaving the entire collection of REGs, i.e., the REGs carrying PDCCHs with resource grant information as well as the REGs carrying the AL=1 PDCCH resources used to carry the modified PHICH.

It should be appreciated that it is further possible to provide additional resources for Hybrid-ARQ indicator bits PHICH by using both of the techniques described above, i.e., by using REGs that are inaccessible to PDCCHs as well as REGs making up an AL=1 PDCCH. This may be applicable in cases where, for example, there are fewer than three unused REGs available in the control region. It is then possible to create a modified PHICH with one or more REGs that come from regions that are accessible to normal PDCCH as well as one or more REGS from regions that are inaccessible to normal PDCCH.

As was the case with the technique described above, the approach in which a modified PHICH group is carried by AL=1 PDCCH resources is transparent to legacy UEs. UEs configured to take advantage of these inventive techniques, however, are adapted to receive the subframe containing the extra PHICH groups formed according to the techniques described above and placed in the AL=1 PDCCH resource, and to use the ACK/NACK information included therein in their normal HARQ processing.

In still another approach, the LTE eNB transmits PUSCH HARQ feedback bits that are carried by a conventional LTE PDCCH. That is, the HARQ bits are processed as any PDCCH shown in FIG. 7. However, this type of PDCCH is distinguished from other PDCCHs by scrambling it, at the eNB, with a new type of RNTI that distinguishes the encoded group of Hybrid-ARQ indicators from encoded resource grant information. For example, a HARQ indicator Radio-network Temporary Identifier (HI-RNTI) might be used, rather than the conventional RNTI. This HI-RNTI can be configured and signaled, e.g., via RRC signaling, to UEs that require PUSCH HARQ feedback in subframes that have no or two few PHICH resources in conventional LTE TDD systems. Each UE is also configured with a set of particular bit positions to read the HARQ feedback bits intended for it, since the PDCCH carrying Hybrid-ARQ indicators can carry bits for several different UEs.

In a variant of this approach, each UE is configured with a set of different HI-RNTIs to use in monitoring PDCCH. The UE selects which HI-RNTI and which bit(s) to monitor in the PDCCH message for a certain PUSCH transmission based on any of the followed listed properties or combinations thereof: a starting index of the assigned PUSCH resources; a length of the assigned PUSCH resources; a cyclic shift used for assigned PUSCH resources; a spreading factor size used for the assigned PUSCH resources; a number of assigned PHICH groups or HI-RNTI; a UE specific RRC configured parameter; and a first or second assigned transport block.

The search space for the UE to use in searching for a PDCCH that carries Hybrid-ARQ indicator data may be given as the common search space, the search space given by the C-RNTI, or a search space derived from the HI-RNTI, to name a few non-limiting examples.

Finally, in still another approach, the LTE eNB follows the encoding and modulation processes illustrated in FIG. 5 for the new modified PHICHs, or some variant thereof. However, in this case the modulation symbols are then placed on top of those symbols normally reserved for PDCCHs carrying resource grant information, rather than in REGs that are otherwise not used. With this approach, the modulation symbols from the modified PHICH will replace the symbols from normal PDCCHs carrying encoded resource grant information, or the modulation symbols for the modified PHICH and normal PDCCHs are combined and both transmitted. Once again, a corresponding UE is preconfigured to know where to look for the modulation symbols for the modified PHICH, and is configured to extract the modified PHICH from the received subframes.

Embodiments of the various techniques described above include methods implemented in an LTE eNodeB, or in a similar wireless network node in another type of network. These methods include the various signaling techniques described above, which include, in several instances, the modification of subframes with no or insufficient PHICH resources, to send additional PHICH signals. Other embodiments include a mobile terminal apparatus adapted to receive signals modified according to any of the techniques described above and to retrieve Hybrid-ARQ indicators from those signals.

Figure 19:
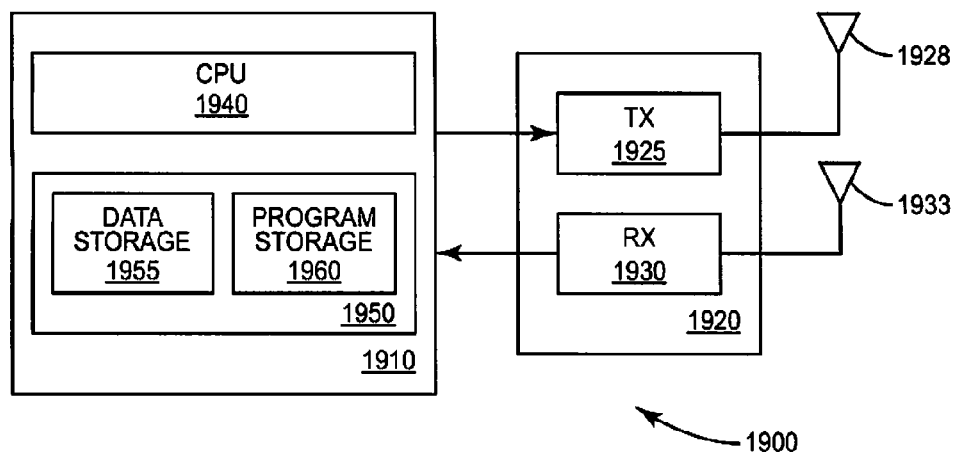
FIG. 19 is a block diagram illustrating components of an example communications node adapted according to the present inventive techniques.

FIG. 19 illustrates features of an example communications node 1900 according to several embodiments of the present invention. Although the detailed configuration, as well as features such as physical size, power requirements, etc., will vary, the general characteristics of the elements of communications 1900 are common to both a wireless base station and a mobile terminal. Further, both may be adapted to carry out one or several of the techniques for encoding and transmitting Hybrid-ARQ indicators or decoding such indicators from a received signal.

Communications node 1900 comprises a transceiver 1910 for communicating with user terminals (in the case of a base station) or with one or more base stations (in the case of a user terminal) as well as a processing circuit 1910 for processing the signals transmitted and received by the transceiver 1920. Transceiver 1920 includes a transmitter 1925 coupled to one or more transmit antennas 1928 and receiver 1930 coupled to one or more receive antennas 1933. The same antenna(s) 1928 and 1933 may be used for both transmission and reception. Receiver 1930 and transmitter 1925 use known radio processing and signal processing components and techniques, typically according to a particular telecommunications standard such as the 3GPP standards for LTE and/or LTE-Advanced. Because the various details and engineering tradeoffs associated with the design and implementation of such circuitry are well known and are unnecessary to a full understanding of the invention, additional details are not shown here.

Processing circuit 1910 comprises one or more processors 1940, hardware, firmware or a combination thereof, coupled to one or more memory devices 1950 that make up a data storage memory 1955 and a program storage memory 1960. Memory 1950 may comprise one or several types of memory such as read-only memory (ROM), random-access memory, cache memory, flash memory devices, optical storage devices, etc. Again, because the various details and engineering tradeoffs associated with the design of baseband processing circuitry for mobile devices and wireless base stations are well known and are unnecessary to a full understanding of the invention, additional details are not shown here.

Typical functions of the processing circuit 1910 include modulation and coding of transmitted signals and the demodulation and decoding of received signals. In several embodiments of the present invention, processing circuit 1910 is adapted, using suitable program code stored in program storage memory 1960, for example, to carry out one of the techniques described above for signaling Hybrid-ARQ indicators to mobile terminals or for receiving encoded Hybrid-ARQ indicators from a base station. Of course, it will be appreciated that not all of the steps of these techniques are necessarily performed in a single microprocessor or even in a single module.

Figure 20:
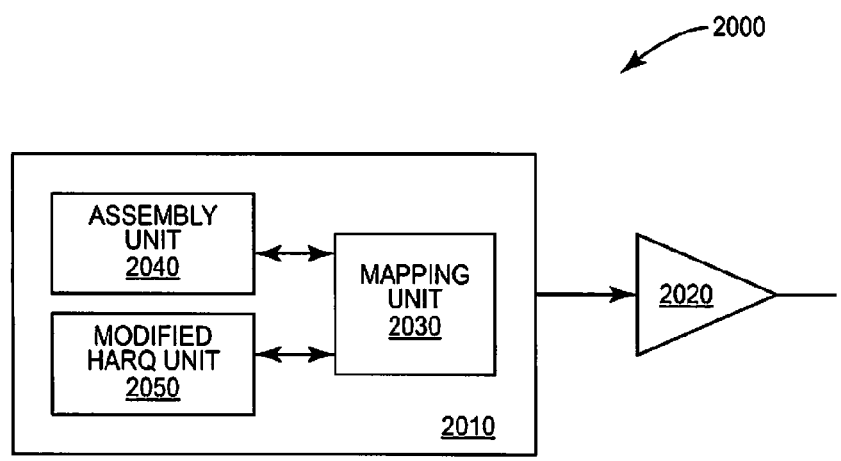
FIG. 20 illustrates features of an example wireless base station.

FIG. 20 illustrates several functional elements of a wireless base station 2000, adapted to carry out some of the techniques discussed in detail above. Wireless base station 2000 includes a processing circuit 2010 configured to construct a series of downlink subframes for transmission by transmitter circuit 2020. In several embodiments, processing circuit 2010, which may be constructed in the manner described for the processing circuits 1910 of FIG. 19, includes a mapping unit 2030, which is adapted to map a PCFICH to first resource elements in a control region of a downlink subframe, and to optionally map one or more PHICHs to second resource elements of the control region of the downlink subframe. Processing circuit 2010 further includes an assembly unit 2040, which is adapted to assemble a plurality of PDCCHs for carrying resource grant information, by aggregating CCEs and allocating the aggregated CCES to first REGs, each REG representing four available resource elements of the control region of the downlink subframe. Processing circuit 2010 further includes a modified Hybrid-ARQ processing unit 2050 adapted to allocate an encoded group of Hybrid-ARQ indicators to a plurality of second REGs. In some embodiments, this is done after the assembling of the PDCCHs. Mapping unit 2030 is further adapted to map the first REGs and the second REGS onto the control region of the first subframe, around the resource elements used by the PHICHs, if present, and the PCFICH, prior to transmission of the downlink subframe by the transmitter 2020.

Novel methods and apparatus for creating new modified PHICH in an LTE TDD subframe that is normally without conventional LTE PHICH resources have been described. This is needed for supporting the Rel-11 interband TDD carrier aggregation with different UL-DL configurations. For TDD or FDD cases with too few conventional LTE PHICH resources, the described methods provide additional PHICH resource to enhance system operations.

It will be appreciated by the person of skill in the art that various modifications may be made to the above described embodiments without departing from the scope of the present invention. For example, it will be readily appreciated that although the above embodiments are described with reference to parts of a 3GPP network, an embodiment of the present invention will also be applicable to like networks, such as a successor of the 3GPP network, having like functional components. Therefore, in particular, the terms 3GPP and associated or related terms used in the above description and in the enclosed drawings and any appended claims now or in the future are to be interpreted accordingly.

Examples of several embodiments of the present invention have been described in detail above, with reference to the attached illustrations of specific embodiments. Because it is not possible, of course, to describe every conceivable combination of components or techniques, those skilled in the art will appreciate that the present invention can be implemented in other ways than those specifically set forth herein, without departing from essential characteristics of the invention. The present embodiments are thus to be considered in all respects as illustrative and not restrictive.

What is claimed is:

1. A method, in a wireless base station configured for operation in a Long-Term Evolution (LTE) wireless network, for providing Hybrid-ARQ signaling in a downlink carrier signal, the method comprising:

mapping a Physical Control Format Indicator Channel (PCFICH) to first resource elements in a control region of a downlink subframe, and optionally mapping one or more Physical Hybrid-ARQ Indicator Channels (PHICHs) to second resource elements of the control region of the downlink subframe;

assembling a plurality of Physical Downlink Control Channels (PDCCHs) for carrying resource grant information, by aggregating control channel elements (CCEs) and allocating the aggregated CCEs to first resource element groups (REGs), each REG representing a plurality of available resource elements of the control region of the downlink subframe;

allocating an encoded group of hybrid automatic-repeat-request (Hybrid-ARQ indicators to a plurality of second REGs, where the second REGs are REGs that are not used by any of the PDCCHs and such that the encoded group of Hybrid-ARQ indicators is allocated to REGs that are inaccessible to any PDCCH;

mapping the first REGs and the second REGs onto the control region of the first subframe, around the resource elements used by the PHICHs, if any PHICHs are present, and around the resource elements used by the PCFICH; and transmitting the downlink subframe.

2. The method of claim 1, wherein the second REGs are consecutive REGs immediately adjacent to a last usable position for PDCCHs.

3. A method, in a wireless base station configured for operation in a Long-Term Evolution (LTE) wireless network, for providing Hybrid-ARQ signaling in a downlink carrier signal, the method comprising:

mapping a Physical Control Format Indicator Channel (PCFICH) to first resource elements in a control region of a downlink subframe, and optionally mapping one or more Physical Hybrid-ARQ Indicator Channels (PHICHs) to second resource elements of the control region of the downlink subframe;

assembling a plurality of Physical Downlink Control Channels (PDCCHs) for carrying resource grant information, by aggregating control channel elements (CCEs) and allocating the aggregated CCEs to first resource element groups (REGs), each REG representing a plurality of available resource elements of the control region of the downlink subframe;

allocating an encoded group of Hybrid automatic-repeat request (Hybrid-ARQ) indicators to a plurality of second REGs;

mapping the first REGs and the second REGs onto the control region of the first subframe, around the resource elements used by the PHICHs, if any PHICHs are present, and around the resource elements used by the PCFICH; and transmitting the downlink subframe;

wherein the second REGs are REGs that are not used by any of the PDCCHs and wherein the encoded group of Hybrid-ARQ indicators comprises eight Hybrid-ARQ indicator bits that are encoded, modulated, and scrambled to form twelve symbols, and wherein the twelve symbols are allocated to three REGs.

4. The method of claim 3, wherein the second REGs are REGs that are not used by any of the PDCCHs.

5. The method of claim 3, wherein the second REGs are non-consecutive REGs in a high REG-index region of the control region.

6. The method of claim 4, wherein the second REGs are consecutive REGs placed at an end of the available REG region.

7. The method of claim 3, wherein mapping the first REGs and the second REGs onto the control region of the first subframe comprises interleaving the entire collection of first REGs and second REGs, cyclically shifting the interleaved REGs, and assigning the shifted, interleaved REGs to resource elements of the control region that are unused by PHICHs, if present, and PCFICHs.

8. The method of claim 3, wherein allocating the encoded group of Hybrid-ARQ indicators to the second REGs comprises placing the encoded group of Hybrid-ARQ indicators in a CCE that is unused by a PDCCH carrying resource grant information.

9. The method of claim 8, wherein the location of each Hybrid-ARQ indicator within the encoded group is based on one or more of:

a starting index for assigned uplink resources corresponding to the Hybrid-ARQ indicator;

a length for assigned uplink resources corresponding to the Hybrid-ARQ indicator;

a cyclic shift used for assigned uplink resources corresponding to the Hybrid-ARQ indicator;

a spreading factor size used for assigned uplink resources corresponding to the Hybrid-ARQ indicator;

a number of assigned Hybrid-ARQ indicator groups corresponding to the Hybrid-ARQ indicator;

a mobile terminal-specific parameter configured by Radio Resource Control (RRC) signaling; and a first or second assigned transport block corresponding to the Hybrid-ARQ indicator.

10. The method of claim 8, wherein the encoded group of Hybrid-ARQ indicators is placed in the CCE along with one or more additional encoded groups of Hybrid ARQ indicators.

11. The method of claim 10, wherein the three REGs for the encoded group of Hybrid-ARQ indicators are interlaced within the CCE with REGs for the one or more additional encoded groups of Hybrid-ARQ indicators.

12. A method, in a wireless base station configured for operation in a Long-Term Evolution (LTE) wireless network, for providing Hybrid-ARQ signaling in a downlink carrier signal, the method comprising:

mapping a Physical Control Format Indicator Channel (PCFICH) to first resource elements in a control region of a downlink subframe, and optionally mapping one or more Physical Hybrid-ARQ Indicator Channels (PHICHs) to second resource elements of the control region of the downlink subframe;

assembling a plurality of Physical Downlink Control Channels (PDCCHs) for carrying resource grant information, by aggregating control channel elements (CCEs) and allocating the aggregated CCEs to first resource element groups (REGs), each REG representing a plurality of available resource elements of the control region of the downlink subframe;

allocating an encoded group of hybrid automatic-repeat-request (Hybrid-ARQ) indicators to a plurality of second REGs;

mapping the first REGs and the second REGs onto the control region of the first subframe, around the resource elements used by the PHICHs, if any PHICHs are present, and around the resource elements used by the PCFICH; and transmitting the downlink subframe;

wherein the second REGs are REGs that are not used by any of the PDCCHs, wherein allocating the encoded group of Hybrid-ARQ indicators to the second REGs comprises placing the encoded group of Hybrid-ARQ indicators in a CCE that is unused by a PDCCH carrying resource grant information and wherein the encoded group of Hybrid-ARQ indicators comprises a plurality of Hybrid-ARQ indicators that are encoded with a cyclic redundancy check (CRC) code that depends on a temporary identifier that distinguishes the encoded group of Hybrid-ARQ indicators from encoded resource grant information.

13. The method of claim 12, wherein the plurality of Hybrid-ARQ indicators is transmitted within a common search space.

14. The method of claim 12, wherein the plurality of Hybrid-ARQ indicators is transmitted within a search space given by the temporary identifier that distinguishes the encoded group of Hybrid-ARQ indicators from encoded resource grant information.

15. A method, in a wireless base station configured for operation in a Long-Term Evolution (LTE) wireless network, for providing Hybrid-ARQ signaling in a downlink carrier signal, the method comprising:

mapping a Physical Control Format Indicator Channel (PCFICH) to first resource elements in a control region of a downlink subframe, and optionally mapping one or more Physical Hybrid-ARQ Indicator Channels (PHICHs) to second resource elements of the control region of the downlink subframe;

assembling a plurality of Physical Downlink Control Channels (PDCCHs) for carrying resource grant information, by aggregating control channel elements (CCEs) and allocating the aggregated CCEs to first resource element groups (REGs), each REG representing a plurality of available resource elements of the control region of the downlink subframe;

allocating an encoded group of hybrid automatic-repeat-request (Hybrid-ARQ) indicators to a plurality of second REGs;

mapping the first REGs and the second REGs onto the control region of the first subframe, around the resource elements used by the PHICHs, if any PHICHs are present, and around the resource elements used by the PCFICH; and transmitting the downlink subframe;

wherein the encoded group of Hybrid-ARQ indicators comprises eight Hybrid-ARQ indicator bits that are encoded, modulated, and scrambled to form twelve symbols, and wherein the twelve symbols are placed in one or more CCEs of one or more PDCCHs carrying resource grant information.

16. The method of claim 15, wherein the twelve symbols replace symbols carrying encoded resource grant information.

17. The method of claim 15, wherein the twelve symbols are combined with symbols carrying encoded resource grant information.

18. A wireless base station configured for operation in a Long-Term Evolution (LTE) wireless network, the wireless base station comprising a transmitter circuit adapted to transmit a series of downlink subframes and a processing circuit, wherein the processing circuit is configured to:

map a Physical Control Format Indicator Channel (PCFICH) to first resource elements in a control region of a downlink subframe, and to optionally map one or more Physical Hybrid-ARQ Indicator Channels (PHICHs) to second resource elements of the control region of the downlink subframe;

assemble a plurality of Physical Downlink Control Channels (PDCCHs) for carrying resource grant information, by aggregating control channel elements (CCEs) and allocating the aggregated CCES to first resource element groups (REGs), each REG representing a plurality of available resource elements of the control region of the downlink subframe;

allocate an encoded group of Hybrid-ARQ indicators to a plurality of second REGs, wherein the second REGs are REGs that are not used by any of the PDCCHs, and such that the encoded group of Hybrid-ARQ indicators is allocated to REGs that are inaccessible to any PDCCH; and wherein the processing circuit is further configured to map the first REGs and the second REGS onto the control region of the first subframe, around the resource elements used by the PHICHs, if any PHICHs are present, and around the resource elements used by the PCFICH, prior to transmission of the downlink subframe by the transmitter.

19. The wireless base station of claim 18, wherein the modified Hybrid-ARQ processing unit is adapted to form the encoded group of Hybrid-ARQ indicators by encoding, modulating, and scrambling eight Hybrid-ARQ indicator bits to form twelve symbols, and to place the twelve symbols in one or more CCEs of one or more PDCCHs carrying resource grant information.

20. The wireless base station of claim 19, wherein the twelve symbols replace symbols carrying encoded resource grant information.

21. The wireless base station of claim 19, wherein the twelve symbols are combined with symbols carrying encoded resource grant information.

22. A wireless base station configured for operation in a Long-Term Evolution (LTE) wireless network, the wireless base station comprising a transmitter circuit adapted to transmit a series of downlink subframes and a processing circuit, wherein the processing circuit is configured to:

map a Physical Control Format Indicator Channel (PCFICH) to first resource elements in a control region of a downlink subframe, and to optionally map one or more Physical Hybrid-ARQ Indicator Channels (PHICHs) to second resource elements of the control region of the downlink subframe;

assemble a plurality of Physical Downlink Control Channels (PDCCHs) for carrying resource grant information, by aggregating control channel elements (CCEs) and allocating the aggregated CCES to first resource element groups (REGs), each REG representing a plurality of available resource elements of the control region of the downlink subframe;

allocate an encoded group of Hybrid-ARQ indicators to a plurality of second REGs; and wherein the processing circuit is further configured to map the first REGs and the second REGS onto the control region of the first subframe, around the resource elements used by the PHICHs, if any PHICHs are present, and around the resource elements used by the PCFICH, prior to transmission of the downlink subframe by the transmitter and wherein the modified Hybrid-ARQ processing unit is adapted to form the encoded group of Hybrid-ARQ indicators by encoding, modulating, and scrambling eight Hybrid-ARQ indicator bits to form twelve symbols, and to allocate the twelve symbols to three REGs.

23. The wireless base station of claim 22, wherein the mapping unit is adapted to map the first REGs and the second REGS onto the control region of the first subframe by interleaving the entire collection of first REGs and second REGs, cyclically shifting the interleaved REGs, and assigning the shifted, interleaved REGs to resource elements of the control region that are unused by PHICHs, if present, and PCFICHs.

24. The wireless base station of claim 22, wherein the modified Hybrid-ARQ processing unit is adapted to allocate the encoded group of Hybrid-ARQ indicators to REGs that are not used by any of the PDCCHs.

25. The wireless base station of claim 24, wherein the modified Hybrid-ARQ processing unit is adapted to allocate the encoded group of Hybrid-ARQ indicators to the second REGs by placing the encoded group of Hybrid-ARQ indicators in a CCE that is unused by a PDCCH carrying resource grant information.

26. The wireless base station of claim 24, wherein the location of each Hybrid-ARQ indicator within the encoded group is based on one or more of:

a starting index for assigned uplink resources corresponding to the Hybrid-ARQ indicator;

a length for assigned uplink resources corresponding to the Hybrid-ARQ indicator;

a cyclic shift used for assigned uplink resources corresponding to the Hybrid-ARQ indicator;

a spreading factor size used for assigned uplink resources corresponding to the Hybrid-ARQ indicator;

a number of assigned Hybrid-ARQ indicator groups corresponding to the Hybrid-ARQ indicator;

a mobile terminal-specific parameter configured by Radio Resource Control (RRC) signaling; and a first or second assigned transport block corresponding to the Hybrid-ARQ indicator.

27. A wireless base station configured for operation in a Long-Term Evolution (LTE) wireless network, the wireless base station comprising a transmitter circuit adapted to transmit a series of downlink subframes and a processing circuit, wherein the processing circuit is configured to:

map a Physical Control Format Indicator Channel (PCFICH) to first resource elements in a control region of a downlink subframe, and to optionally map one or more Physical Hybrid-ARQ Indicator Channels (PHICHs) to second resource elements of the control region of the downlink subframe;

assemble a plurality of Physical Downlink Control Channels (PDCCHs) for carrying resource grant information, by aggregating control channel elements (CCEs) and allocating the aggregated CCES to first resource element groups (REGs), each REG representing a plurality of available resource elements of the control region of the downlink subframe;

allocate an encoded group of Hybrid-ARQ indicators to a plurality of second REGs; and wherein the processing circuit is further configured to map the first REGs and the second REGS onto the control region of the first subframe, around the resource elements used by the PHICHs, if any PHICHs are present, and around the resource elements used by the PCFICH, prior to transmission of the downlink subframe by the transmitter, wherein the modified Hybrid-ARQ processing unit is adapted to allocate the encoded group of Hybrid-ARQ indicators to REGs that are not used by any of the PDCCHs, and wherein the modified Hybrid-ARQ processing unit is adapted to form the encoded group of Hybrid-ARQ indicators by encoding a plurality of Hybrid-ARQ indicators with a cyclic redundancy check (CRC) code that depends on a temporary identifier that distinguishes the encoded group of Hybrid-ARQ indicators from encoded resource grant information.

* * * * *